US012294600B2

(12) United States Patent
Sivaswamy et al.

(10) Patent No.: US 12,294,600 B2
(45) Date of Patent: May 6, 2025

(54) REAL TIME BEHAVIORAL ALERT PROCESSING IN COMPUTING ENVIRONMENTS

(71) Applicant: International Business Machines Corporation, Armonk, NY (US)

(72) Inventors: Hemant Kumar Sivaswamy, Pune (IN); Alberto Pelliccione, Amsterdam (NL)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/823,097

(22) Filed: Aug. 30, 2022

(65) Prior Publication Data
US 2024/0073229 A1     Feb. 29, 2024

(51) Int. Cl.
    *H04L 9/40* (2022.01)
(52) U.S. Cl.
    CPC ...... *H04L 63/1425* (2013.01); *H04L 63/1416* (2013.01)
(58) Field of Classification Search
    CPC .......... G06F 9/45558; G06F 16/24578; G06F 21/604; G06F 21/64; G06F 21/554; G06F 21/557; G06N 5/022; G06N 20/00; H04L 43/10; H04L 63/20; H04L 63/1425; H04L 63/1466; H04L 63/1433; H04M 3/38; G06Q 10/06393
    See application file for complete search history.

(56) References Cited

U.S. PATENT DOCUMENTS

| | | | |
|---|---|---|---|
| 10,904,277 B1* | 1/2021 | Sharifi Mehr | H04L 63/1425 |
| 11,368,470 B2 | 6/2022 | Liu et al. | |
| 11,663,329 B2* | 5/2023 | Givental | G06F 21/554 |
| | | | 726/23 |
| 2011/0302652 A1* | 12/2011 | Westerfeld | H04L 43/10 |
| | | | 726/22 |
| 2016/0301704 A1* | 10/2016 | Hassanzadeh | G06F 21/64 |
| 2017/0149805 A1* | 5/2017 | Kurian | H04M 3/38 |

(Continued)

FOREIGN PATENT DOCUMENTS

WO    WO2017176676 A1    10/2017

OTHER PUBLICATIONS

"Cosine similarity," Wikipedia, the Free Encyclopedia, Jun. 20, 2022, 7 pages, Available at: https://en.wikipedia.org/w/index.php?title=Cosine_similarity&oldid=1094115531, Accessed Aug. 18, 2022.

(Continued)

*Primary Examiner* — Dustin Nguyen
(74) *Attorney, Agent, or Firm* — Yee & Associates, P.C.

(57) ABSTRACT

A computer implemented method processes alerts. A computer system creates a representation of an alert received for processing. The computer system determines a similarity of the alert with previously processed alerts using the representation of the alert and representations of the previously processed alerts. A first evaluator in the computer system evaluates an alert level for the alert based on previously processed similar alerts in response to the similarity being above a similarity threshold for similar alerts. A second evaluator in the computer system evaluates, the alert level for the alert using a machine learning model in response to the similarity not being above the similarity threshold.

21 Claims, 16 Drawing Sheets

(56) References Cited

U.S. PATENT DOCUMENTS

| | | | | |
|---|---|---|---|---|
| 2018/0034836 | A1 | 2/2018 | Chen et al. | |
| 2018/0103052 | A1* | 4/2018 | Choudhury | H04L 63/20 |
| 2018/0255080 | A1* | 9/2018 | Paine | H04L 63/1466 |
| 2018/0351981 | A1* | 12/2018 | Muddu | G06N 20/00 |
| 2020/0036741 | A1* | 1/2020 | Duchin | G06F 9/45558 |
| 2021/0152581 | A1* | 5/2021 | Hen | G06F 21/604 |
| 2021/0176260 | A1* | 6/2021 | Pan | G06N 5/022 |
| 2021/0273958 | A1* | 9/2021 | McLean | H04L 63/1433 |
| 2021/0273961 | A1* | 9/2021 | Humphrey | H04L 63/1425 |
| 2021/0294715 | A1* | 9/2021 | Hicks | G06Q 10/06393 |
| 2021/0311952 | A1* | 10/2021 | Jain | G06F 16/24578 |
| 2021/0349994 | A1* | 11/2021 | Ravindra | G06F 21/577 |
| 2022/0053016 | A1 | 2/2022 | Trost et al. | |
| 2023/0012220 | A1* | 1/2023 | Humphrey | H04L 63/1425 |
| 2023/0328083 | A1* | 10/2023 | Gundersen | H04L 63/20 |
| | | | | 726/22 |

OTHER PUBLICATIONS

"Tf-idf.," Wikipedia, the Free Encyclopedia, Jul. 16, 2022, Available at: https://en.wikipedia.org/w/index.php?title=Tf%E2%80%93idf&oldid=1098671947, Accessed Aug. 18, 2022.

Zager et al., Graph Similarity Scoring and Matching, Applied Mathematics Letters, Jan. 2008, vol. 21, No. 1, pp. 86-94.

Zhou et al., "Graph Neural Networks: A Review of Methods and Applications," AI Open, 2020, vol. 1, pp. 57-81.

IBM. "IBM QRadar EDR", EDR, retrieved from web https://reaqta.com/press-releases/cyber-assistant/, dated Mar. 7, 2025, 17 pages.

* cited by examiner

REAL TIME BEHAVIORAL ALERT PROCESSING IN COMPUTING ENVIRONMENTS

BACKGROUND

1. Field

The disclosure relates generally to improved computer system and more specifically to a computer implemented method, apparatus, system, and computer program product for processing behavioral alerts in real time.

2. Description of the Related Art

With the reliance on computers systems, network security is important to protect the systems from disclosure, theft, or damage to hardware, software, or electronic data is and computer networks. In protecting computer systems against these and other types of threats, security platforms can be used to detect monitor and prevent unauthorized access, misuse, damage, modification, or denial of access to computer systems and electronic information on the computer systems.

Security platforms can produce a vast amount of security alerts from a variety of sources including endpoints, network devices, cloud services, and alert generating sources. Security agents on different computing devices can generate security alerts in response to detecting anomalies. Security agents can detect anomalies when events occur that do not follow security policies or rules. In response to detecting these anomalies, security agents can generate security alerts and send the security alerts for analysis and processing. The handling of security alerts includes a human in the loop that is capable of validating alerts, distinguishing between false-positives and true-positives, evaluate severity and impact of the alerts, and then resolve the alerts.

SUMMARY

According to one illustrative embodiment, a computer implemented method for processes alerts. A computer system creates a representation of an alert received for processing. The computer system determines a similarity of the alert with previously processed alerts using the representation of the alert and representations of the previously processed alerts. A first evaluator in the computer system evaluates an alert level for the alert based previously processed similar alerts in response to the similarity being above a similarity threshold for similar alerts. A second evaluator in the computer system evaluates the alert level for the alert using a machine learning model in response to the similarity not being above the similarity threshold. According to other illustrative embodiments, a computer system and a computer program product for processing alerts are provided.

According to another illustrative embodiment, a computer implemented method processes security alerts. A computer system receives a security alert. The security alert comprises a behavioral graph for the security alert. The computer system creates a vector representation of the security alert. The computer system determines a similarity of the security alert with previously security processed alerts using the vector representation of the security alert and vector representations of the previously security processed alerts. A first evaluation in the computer system evaluates a risk level for the security alert based on previously processed similar security alerts in response to the similarity being above a similarity threshold for similar security alerts. A second evaluator in the computer system evaluates the risk level for the security alert using a machine learning model in response to the similarity not being above the similarity threshold. According to other illustrative embodiments, a computer system and a computer program product for processing security alerts are provided.

DETAILED DESCRIPTION

Figure 1:
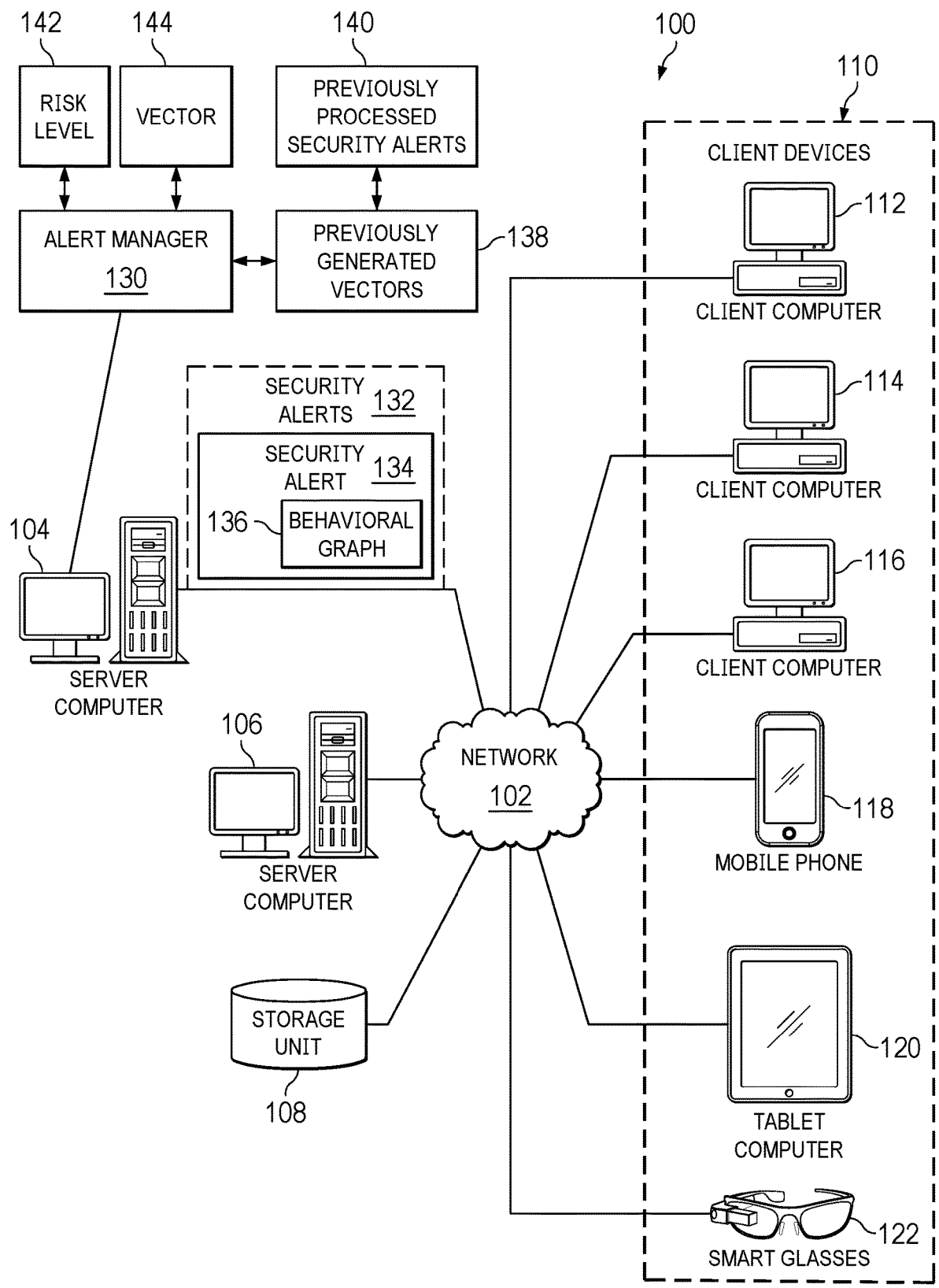
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations as described herein. For example, the illustrative embodiments recognize and take into account that current techniques are resource intensive, time consuming, and requires the user to have extensive domain and infrastructural knowledge. Current security alert processes require human analysts analyzing security alerts to have extensive knowledge about domains and infrastructure in computer systems. With these processes being resource intensive, time-consuming, and requiring extensive domain and infrastructure knowledge, evaluation of security alerts and take more time than desired. Further, with a delay in the valuation resolution of security alerts, attackers and intrusions can continue resulting in data being stolen or destroyed.

Thus, illustrative embodiments of the present invention provide a computer implemented method, an apparatus, a computer system, and a computer program product for processing alerts. The illustrative embodiments can process security alerts in real time. In one illustrative example, a computer system creates a representation of an alert received for processing. The computer system determines a similarity of the alert with previously processed alerts using the representation of the alert and representations of the previously processed alerts. A first evaluator in the computer system evaluates an alert level for the alert based previously processed similar alerts in response to the similarity being above a similarity threshold for similar alerts. A second evaluator in the computer system evaluates, the alert level for the alert using a machine learning model in response to the similarity not being above the similarity threshold.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of"60 when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, alert manager 130 is located in server computer 104. Alert manager 130 can receive security alerts 132 from computing devices in network data processing system 100. For example, security alerts 132 can be received from at least one of client devices 110, server computer 106, and storage unit 108 over network 102. In this example, security alerts 132 takes the form of behavioral graphs.

As depicted in this example, security alert 134 in security alerts 132 includes behavioral graph 136. In this illustrative example, behavioral graph 136 is a directed acyclic graph in which each node represents an event end the edges indicate a flow from one node to another node.

In this illustrative example, the events in behavioral graph 136 are the events collected when security alert 134 was generated. In this depicted example, behavioral graph 136 also contains information about the events represented by nodes in behavioral graph 136. The information is metadata and can be, for example, process type, event types, privileges, timestamps, user, execution paths, command line arguments, and other information can be included in these directed acyclic graphs.

For example, node A is connected to node B with a line indicating a flow from node A to node B. In this example, node B is a result of the action performed by node A. In this example, alert manager 130 can transform behavioral graph 136 in security alert 134 into vector 144. Alert manager 130 can compare vector 144 with previously generated vectors 138 for previously processed security alerts 140. This comparison to previously generated vectors 138 can determine the similarity of security alert 134 to previously processed security alerts 140.

Depending on the amount of similarity, alert manager 130 can use different evaluation systems to process the alerts in a manner that is more efficient as compared to current techniques. For example, a first evaluator can be used to process security alert 134 when similarity of security alert 134 is determined to be identical or sufficiently similar to another previously processed security alert in previously processed security alerts 140. This first evaluator can perform evaluations based on thresholds.

In the event that security alert 134 is not determined to be sufficiently similar to identical to previously processed security alerts 140, security alert 134 is considered a new security alert. In this case, security alert 134 can be processed by a second evaluator. In this illustrative example, alert manager 130 uses a machine learning model to evaluate security alert 134. Through these evaluations, alert manager 130 can identify risk level 142 for security alert 134. Risk level 142 can be, for example, malicious, ambiguous, or benign for security alert 134.

With risk level 142, alert manager 130 can perform a set of actions. The set of actions can include alerting a human analyst, logging the security alert, recommended removal of an offending binary file, automatically removing an offending binary file, recommended isolation of a computing device, automatically isolating the computing device, sending security alert 134 to a human analyst, or some other suitable action.

As result, alert manager 130 can perform evaluations of security alerts one without needing user entered invention or input. Based on the results of these evaluations, alert manager 130 can selectively recommend actions or automatically perform actions to handle security alerts 132. In some cases, based on the evaluation, action taken by alert manager 130 can be to send security alert 134 to a human analyst for further analysis. In this illustrative example, alert manager 130 can automatically perform evaluations for alerts that are similar to previously processed security alerts. Further, this processing can be performed using a programmable rule-based system that does not require training as with machine learning models. Alert manager 130 can quickly determine how to process new security alerts once a new security alert has been processed and is added to the previously processed security alerts.

Figure 2:
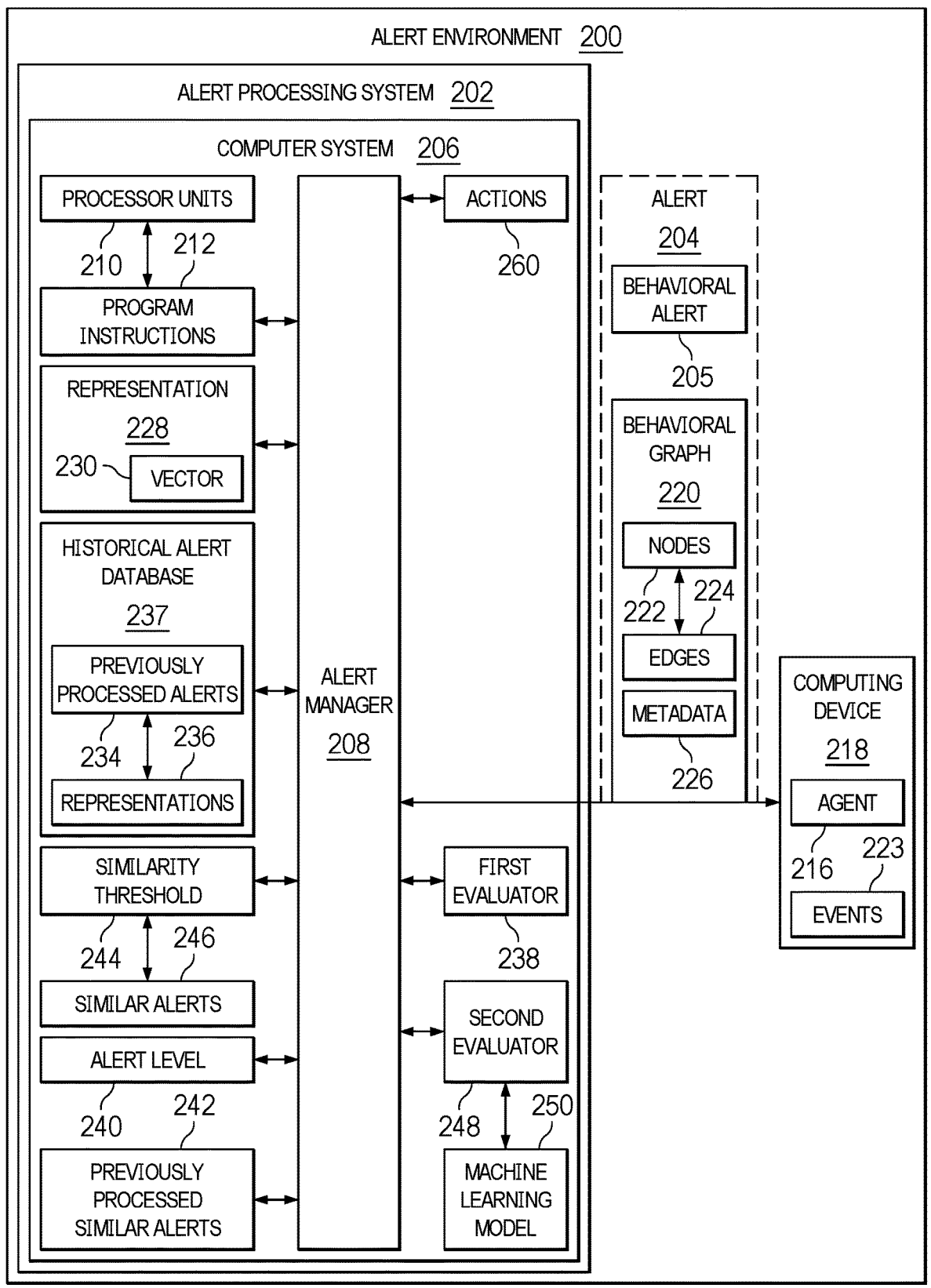
FIG. 2 is a block diagram of an alert environment in accordance with an illustrative embodiment.

With reference now to FIG. 2, a block diagram of an alert environment is depicted in accordance with an illustrative embodiment. In this illustrative example, alert environment 200 includes components that can be implemented in hardware such as the hardware shown in network data processing system 100 in FIG. 1.

Alert environment 200 is an environment in which alert processing system 202 can process alerts. In this illustrative example, alert processing system 202 comprises computer system 206 and alert manager 208. As depicted, alert manager 208 is located in computer system 206.

Alert manager 208 can be implemented in software, hardware, firmware or a combination thereof. When software is used, the operations performed by alert manager 208 can be implemented in program instructions configured to run on hardware, such as a processor unit. When firmware is used, the operations performed by alert manager 208 can be implemented in program instructions and data and stored in persistent memory to run on a processor unit. When hardware is employed, the hardware can include circuits that operate to perform the operations in alert manager 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

As depicted, computer system 206 includes a number of processor units 210 that are capable of executing program instructions 212 implementing processes in the illustrative examples. As used herein a processor unit in the number of processor units 210 is a hardware device and is comprised of hardware circuits such as those on an integrated circuit that respond and process instructions and program instructions that operate a computer. When the number of processor units 210 execute program instructions 212 for a process, the number of processor units 210 is one or more processor units that can be on the same computer or on different computers. In other words, the process can be distributed between processor units on the same or different computers in a computer system. Further, the number of processor units 210 can be of the same type or different type of processor units. For example, the number of processor units 210 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, alert manager 208 receives alert 204 for processing. As depicted, alert 204 is created by agent 216 located in computing device 218. In this example, computing device 218 is a hardware device and can be selected from a group comprising a client device, a client computer, a mobile phone, a tablet computer, a laptop computer, a server computer, a gateway, a sensor system, an Internet of things (IoT) device, or other type computing device that can process data.

Agent 216 is software and can monitor events occurring in computing device 218 to generate alert 204 in response to detecting anomalies occurring in computing device 218. The generation of alert 204 can be rule-based and generated on parameters that exceed thresholds during the execution of processes in computing device 218. In another illustrative example, agent 216 can include an artificial intelligence system that monitors computing device 218. For example, agent 216 can be a machine learning model that monitors computing device 218.

In this illustrative example, alert 204 comprises behavioral graph 220. In this depicted example, alert 204 is behavior alert 205 in which behavioral graph 220 describes behaviors in the form of events 223 that caused the generation of alert 204 for computing device 218. Behavioral graph 220 is a directed acyclic graph in this example. Loops are not present in directed acyclic graph. This type of graph can also be referred to as a directed graph.

As depicted, behavioral graph 220 comprises nodes 222 for events 223, edges 224 connecting nodes 222, and metadata 226. Each node in nodes 222 represents an event in events 223, and each edge in edges 224 represents flow from one node to another node in nodes 222. In this example, edges 224 are directional edges in which the flow is from one node to another node.

Metadata 226 comprises information about events 223. In this depicted example, metadata 226 can uniquely identify each event in events 223 on computing device 218 represented by nodes 222. For example, metadata 226 can include information such as a process, an event type, a privilege, a timestamp, an error code, a parameter, a user to which the process belongs, a path, and other information about the event. In these illustrative examples, metadata 226 can also include an initial risk score assigned by agent 216 in computing device 218.

In this illustrative example, alert manager 208 creates representation 228 of alert 204 received for processing. For example, in creating representation 228, alert manager 208 can process behavioral graph 220 of events 223 connected to each other for alert 204 to generate vector 230 of events 223. In other words, vector 230 is a vector representation of events 223 created from the representation of events 223 in behavioral graph 220. In this illustrative example, alert manager 208 creates vector 230 as a one-dimensional representation of behavioral graph 220 without losing information needed to evaluate alert 204.

Alert manager 208 can determine a similarity of alert 204 with previously processed alerts 234 using representation 228 of alert 204 and representations 236 of previously processed alerts 234. The similarity can be made by comparing representation 228 with representations 236 for previously processed alerts 234. In this illustrative example, previously processed alerts 234 and representations 236 can be located in a historical alert database 237.

In this illustrative example, alert manager 208 can use first evaluator 238 to evaluate alert level 240 for alert 204 based on previously processed similar alerts 242 in response to the similarity being above a similarity threshold 244 for similar alerts 246. In this example, alert manager 208 can use second evaluator 248 that can evaluate alert level 240 for alert 204 using machine learning model 250 in response to the similarity not being above similarity threshold 244.

Further, alert manager 208 can perform a set of actions 260 based on the results generated by first evaluator 238 and second evaluator 248. As used herein, "a set of" when used with reference to items means one or more items. For example, a set of actions 260 is one or more actions 260. In this illustrative example, the set of actions can include, for example, sending alert 204 to a user for further processing, logging the result of processing alert 204, generating an alert message, isolating a computing device, recommending further inspection of a computing device, or other suitable actions.

Figure 3:
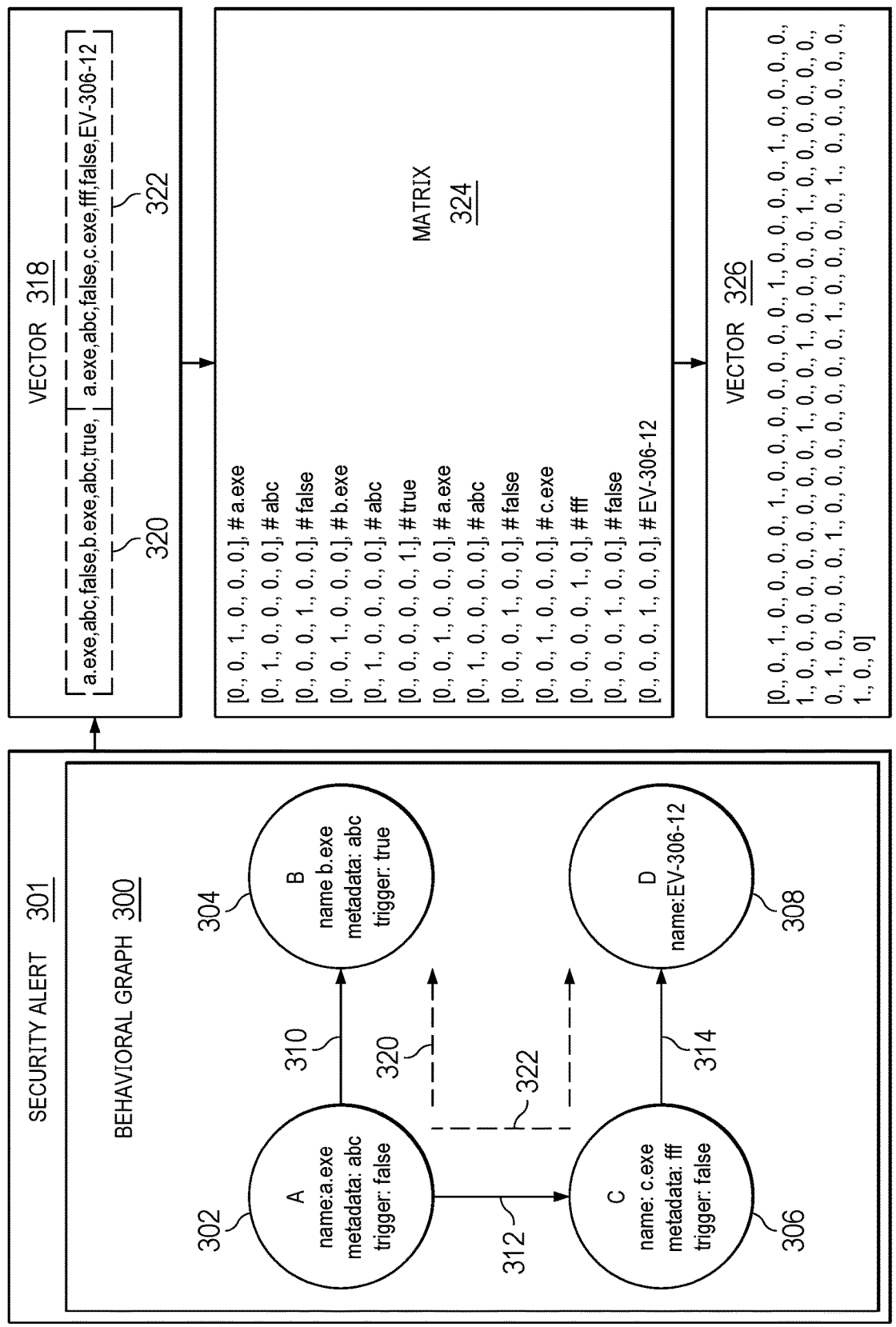
FIG. 3 is a block diagram illustrating processing of a behavioral graph of events to generate a vector of the events in accordance with an illustrative embodiment.

With reference next to FIG. 3, a block diagram illustrating processing of a behavioral graph of events to generate a vector of the events is depicted in accordance with an illustrative embodiment. In this illustrative example, behavioral graph 300 is for an alert in the form of security alert 301. Behavioral graph 300 is an example of behavioral graph 220 in FIG. 2.

As depicted, behavioral graph 300 comprises node A 302, node B 304, node C 306, and node D 308, edge 310, edge 312, and edge 314. Edge 310 connects node A 302 to node B 304. Edge 312 connects node A 302 to node C 306. Edge 314 connects node C 306 to node D 308. With this example, these nodes represent events occurring for security alert 301. These events can include the execution of program code such as applications and actions performed by the applications.

The metadata includes the identification of the executable files for the applications or actions performed in this example. For example, the name is "a.exe", the metadata is "abc" and the trigger is "false" for node A 302. For node B 304, the name is "b.exe", the metadata is "abc" and the trigger is "true". For node C 306, the name is "c.exe", the metadata is "fff" and the trigger is "false", and for node D 308, name is EV-306-12.

In this example, node D 308 is for an event in the form of an action. "EV" means that the node is for an event in the form of an action rather than an application or program code. Additionally, "306" is the coordinate of the origin node, which is node D 308, and "12" is an identifier. In this example, node D 308 is an example of an origin node. A destination node is not present in this example, because node D 308 is a leaf node. If another node is connected to node D 308, then the identifier of the destination node is also included.

Other metadata can be present but not shown in this example to avoid obscuring the description of the example. For example, other metadata that can be present includes application internal name versus the application name on disk, a user that ran the application, an endpoint from which the application was run, a privilege level, a path, command line arguments, and other information. In these examples, some nodes do not represent an event in which an executable, such as a program or application, is run but represent an event in the form of an action, such as keylogging, file encryption, password harvesting, and other actions. In this case the metadata associated is event-specific and it contains information pertaining specifically to that event such as what keystrokes were reported, what files were encrypted, what passwords were harvested, and other information related to the action.

In this example, behavioral graph 300 is processed to create vector 318, which is a one-dimensional vector. Vector 318 is an example of vector 230 in FIG. 2. As depicted, vector 318 is a more compressed form of behavioral graph 300. In this example, vector 318 is a one-dimensional representation of behavioral graph 300 that uses less space that contains the information needed to evaluate security alert 301.

In this illustrative example, behavioral graph 300 is translated into vector 318 through multiple traversals of behavioral graph 300. Each traversal through a path in behavioral graph 300 involves identifying the node from the root node, node A 302 along a path to an end node or leaf node.

As depicted, behavioral graph 300 has two branches identified from traversing the behavioral graph 300. First branch 320 in behavioral graph 300 is node A 302 to node B 304. Second branch 322 in behavioral graph 300 is node A 302 to node C 306 to node D 308. Once all of the paths have been traversed to identify the branches, then metadata is extracted from the nodes.

As depicted, vector 318 comprises a.exe, abc, false, b.exe, 123, true, a.exe, abc, false, c.exe, fff, false, EV-306-12. In this example, a.exe, abc, false, b.exe, 123, true in vector 318 corresponds to first branch 320, and a.exe, abc, false, c.exe, fff, false, EV-306-12 in vector 318 corresponds to second branch 322.

Further, tokenization can be performed on vector 318 to transform metadata from a literal form into a numeric form that maintains the information for comparison with other previously generated vectors for previously received behavioral graphs for processing security alerts. This tokenization generates a numeric representation in which each element in vector 318 represents a coordinate as depicted in matrix 324 containing coordinates for vector 326.

In this example, row line in matrix 324 represents a coordinate for vector 318. Vector 326 is a string form of matrix 324. In this tokenized form, the coordinates for each node in vector 326 can be compared to the coordinates for other nodes and other tokenized vectors from the behavioral graphs of other previously processed security alerts. This comparison can be made to determine the distance of vector 326 from other tokenized vectors. This comparison can be measured using cosine similarity.

Figure 4:
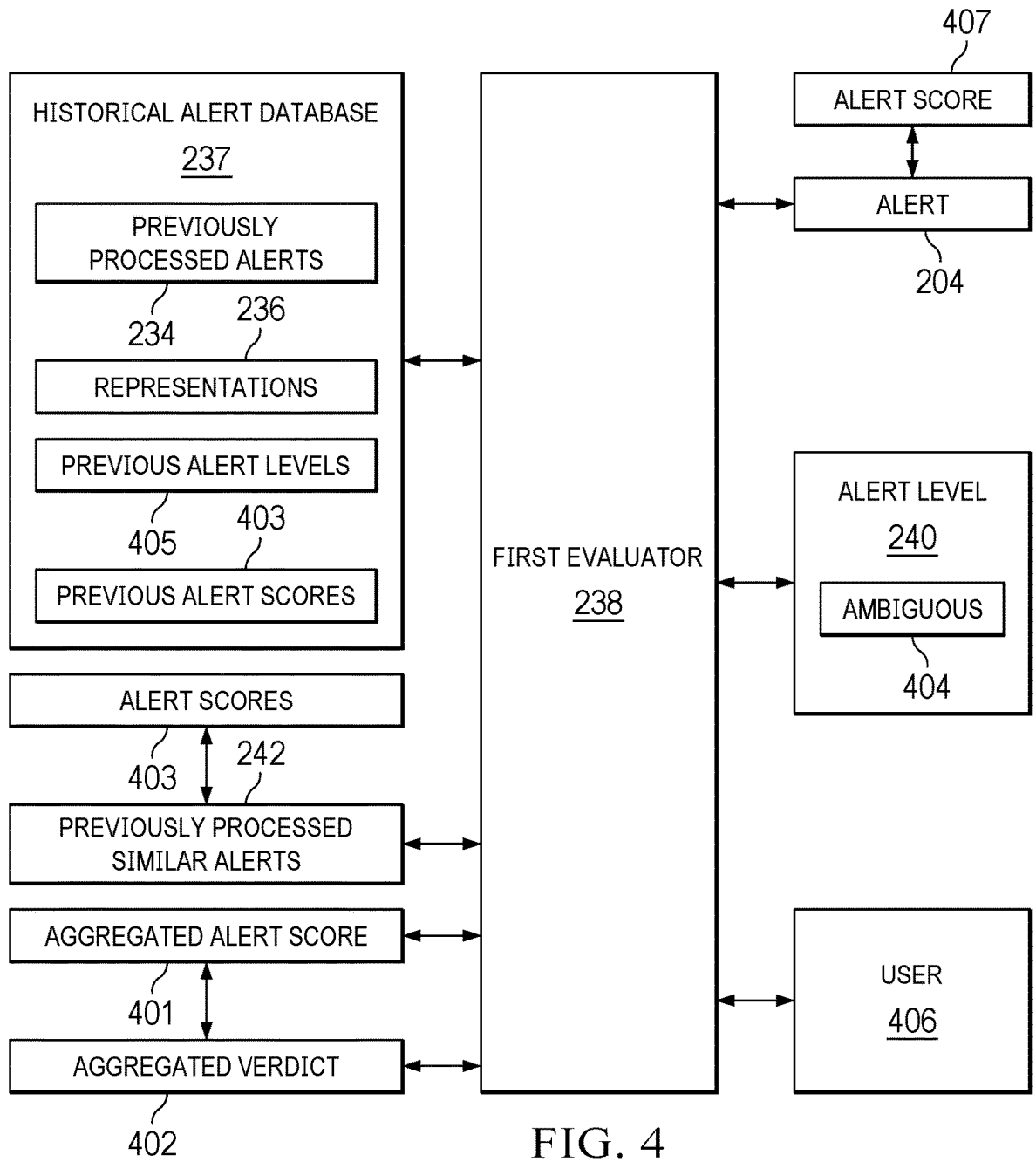
FIG. 4 is an illustration of dataflow for processing an alert using a first evaluator in accordance with an illustrative embodiment.

With reference next to FIG. 4, an illustration of dataflow for processing an alert using a first evaluator is depicted in accordance with an illustrative embodiment. In this example, first evaluator 238 is used to process similar alerts in response the similarity being above similarity threshold 244 for similar alerts 246. As depicted, first evaluator 238 collects alerts from previously processed alerts 234 that are identical to alert 204 and previously processed alerts 234 that are above similarity threshold 244 to form previously processed similar alerts 242.

In this illustrative example, first evaluator 238 can determine aggregated alert score 401 for alert 204 using previously processed similar alerts 242. In this example, aggregated alert score 401 can be determined from combining or aggregating previous alert scores 403 for previously processed similar alerts 242. In one illustrative example, previous alert scores 403 and previous alert levels 405 can be stored in historical alert database 237 for previously processed alerts 234.

In this example, first evaluator 238 determines aggregated verdict 402 using the previously processed similar alerts 242 identified from previously processed alerts 234 as being sufficiently similar to alert 204. First evaluator 238 then determines whether aggregated verdict 402 is ambiguous 404. In this example, first evaluator 238 marks alert level 240 for alert 204 as ambiguous 404 in response to aggregated verdict 402 of previously processed similar alerts 242 being ambiguous 404. Alert 204 is sent to user 406 in response to alert 204 being marked as ambiguous. In this example, user 406 can be a human user such as an analyst or cybersecurity expert. In other illustrative examples, user 406 can a software such as a machine learning model.

If alert 204 is not determined to be ambiguous, aggregated alert score 401 can be used as an alert score 407 for alert 204. For example, the aggregation of previous alert scores 403 for previously processed similar alerts 242 can be used to set alert score 407 for alert 204. In other illustrative examples, alert score 407 can be adjusted based on other factors. For example, if alert score 407 is 95, the score can be reduced to 70 if alert 204 was generated on a device that does not contain sensitive information. As another example, alert score 407 can be increased to 100 if the alert was generated by a computing device in the form of a critical function computer.

Figure 5:
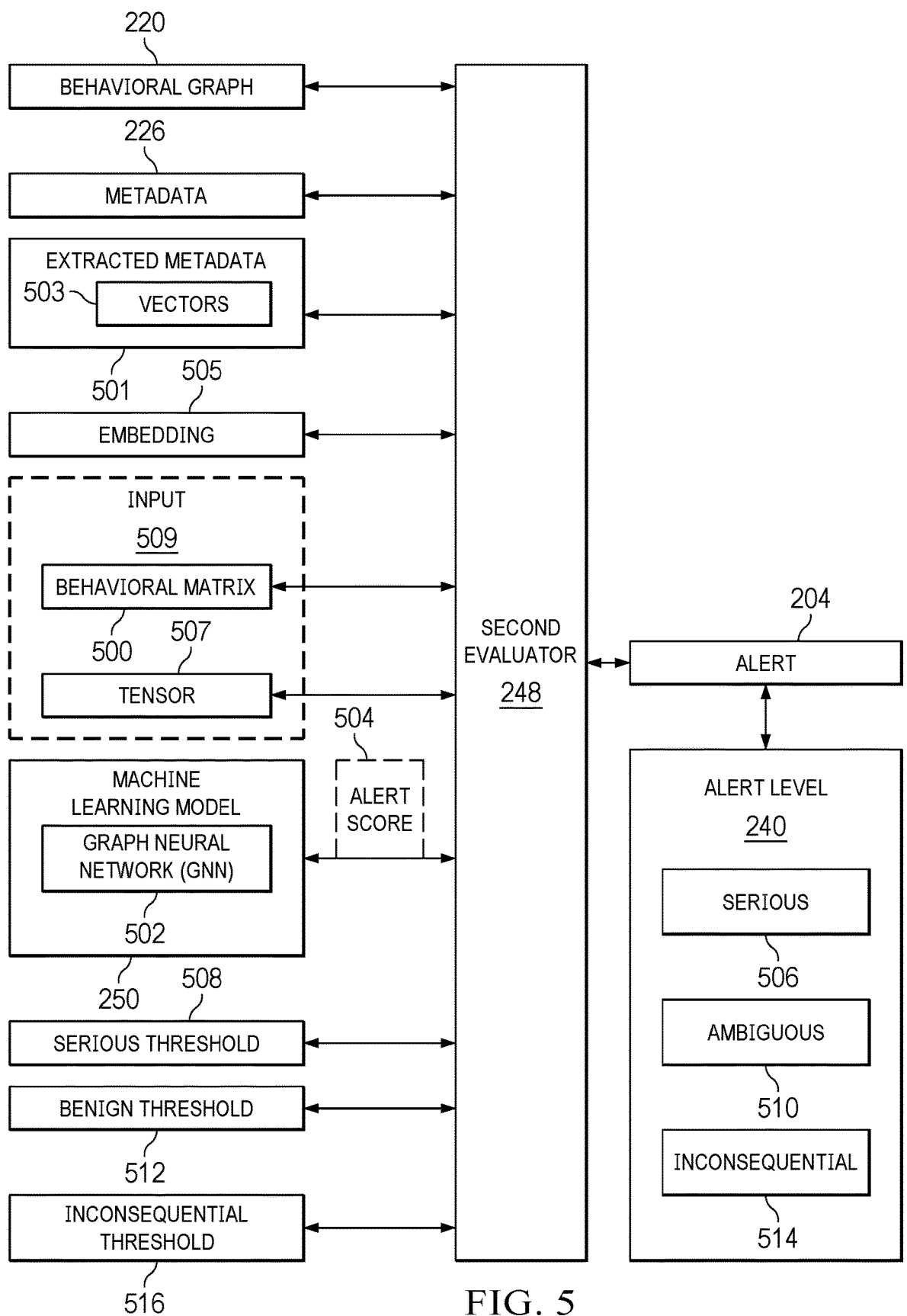
FIG. 5 is an illustration of dataflow for processing an alert using a first evaluator in accordance with an illustrative embodiment.

Turning to FIG. 5, an illustration of dataflow for processing an alert using a first evaluator is depicted in accordance with an illustrative embodiment. In this example, second evaluator 248 is used to process alerts that are not identical or similar to previously processed alerts. In other words, second evaluator 248 can be used to process new events that have not been previously encountered.

In this example, the behavioral matrix identifies connections between nodes in the behavioral graph. Behavioral matrix 500 is an adjacency matrix in this illustrative example. An adjacency matrix identifies what nodes are connected to other nodes in behavioral graph 220. For example, a row in the adjacency matrix for node A has a logic "1" for each node that node A is connected to and a logic "0" for each node that is not connected to node A. Further, second evaluator 248 also identifies metadata 226 for the different nodes 222 in behavioral matrix 500.

In this illustrative example, metadata 226 can be extracted from each of the nodes. The extraction of metadata 226 can be performed such that metadata is extracted in the same order from each node to maintain a current representation across different alerts to form extracted metadata 501. Extracted metadata 501 can be a series of vectors 503. Each vector can represent a particular portion of the metadata. For example, a first vector can be process name, a second vector can be argument, a third vector can be privileges, and other suitable types of vectors for the metadata.

In this illustrative example, vectors 503 can be converted into embedding 505. This conversion can be performed using a process such, for example, Fasttex, which is a library for learning worded embeddings and text classification. The resulting embedding may have an instance of "dog" which is 1235 and an instance of "wolf" may be 1230, which indicates the relationship between dogs and wolves. The embeddings can return close results for similar or related words based on concepts represented by the words. For example, "book" and "pamphlet" can be close as they're conceptually almost the same thing. However, "dog" and "chair" not close because they represent very different and unrelated concepts.

Embedding 505 can then be combined to form tensor 507. Tensor 507 is a form of metadata 226 extracted from behavioral graph 220 that can be sent to graph neural network 502 in this example. As depicted, behavioral matrix 500 and tensor 507 form input 509.

In this illustrative example, tensor 507 is used because graph neural network 502 requires data in the form of tenses for processing. When other types of machine learning models are used, tensor 507 may be unnecessary and other forms of metadata 226 can be used in input 509.

Second evaluator 248 sends input 509 comprising behavioral matrix 500 and metadata 226 in the form of tensor 507 into machine learning model 250. In this example, machine learning model 250 form of graph neural network (GNN) 502. In response, machine learning model 250 returns alert score 504 for alert 204. With alert score 504, second evaluator 248 can identify alert level 240 for alert 204. Alert 204 is serious 506 if alert score 504 is greater than or equal to serious threshold 508. Second evaluator 248 identifies alert 204 as ambiguous 510 if alert score level for alert 204 is greater than benign threshold 512 and less than serious threshold 508. In this example, second evaluator 248 identifies alert 204 as inconsequential 514 if alert score level is less than or equal to inconsequential threshold 516.

With this processing of alert 204, the results of this processing can be stored in historical alert database 237. In other words, after processing, alert 204 becomes a previously processed alert. The behavioral graph, metadata, vectors, alert score, alert level, and other information generated during the processing of alert 204 can be stored in historical alert database 237. In this illustrative example, historical alert levels and historical actions from previous analysis and handling of previously processed alerts 234 can be stored in historical alert database 237.

In this example, first evaluator 238 previously would be unable to process an alert that is identical or similar to alert 204 when alert 204 was determined to be new and not similar to other previously processed alerts. Now, with the information from processing alert 204, first evaluator 238 is able to process other alerts that are similar to alert 204 instead of those alerts being identified as being new. In this manner, first evaluator 238 can learn to process new alerts more quickly than a machine learning model. This type of learning can also be referred to as a one-shot learning system in which a new alert is only seen once as part of being processed using a machine learning model with that result being used for processing future alerts that are identical or similar.

When alert 204 takes the form of a security alert, serious 506 can be referred to as malicious. Further, inconsequential 514 can be referred to as benign with respect to the marking or labeling of alert 204 when alert 204 is a security alert. As depicted, graph neural network 502 has been trained using data sets comprising behavioral matrices and tensors formed from metadata for previously processed security alerts. Further, these training data sets can include the resulting labels classifying the security alerts and actions taken.

In one illustrative example, one or more technical solutions are present that overcome a technical problem with processing alerts as quickly and accurately as compared to current techniques. As a result, one or more illustrative examples enables processing of alerts. The processing of these alerts can be performed by alert manager 208 using first evaluator 238 that contains program code to implement rules or logic for processing alerts based on similarity to previously processed alerts. This processing of alerts by alert manager 208 can also include using second evaluator 248 that employs machine learning model 250 to process new alerts that are not considered similar or identical to previously processed alerts. As a result, alert manager 208 can handle the processing of alerts in a manner that finds similarity to other previously processed alerts and can apply a decision-making process based on prior decisions made for those similar alerts. Further, alert manager 208 can handle completely new alerts that have never been seen. This handling of new alerts can be processed automatically with a desired level of accuracy. Further, the results from processing new alerts using second evaluator 248 that employs machine learning model 250 can be saved for use by first evaluator 238 to process future alerts. As result, a one-shot learning process is present for enabling first evaluator 238 to process a new type of alert with only information from a single processing of that alert. The addition of the information for this new alert to a database of previously processed alerts can enable identification of similar identical alerts when new alerts are received.

Computer system 206 can be configured to perform at least one of the steps, operations, or actions described in the different illustrative examples using software, hardware, firmware or a combination thereof. As a result, computer system 206 operates as a special purpose computer system in which alert manager 208 using first evaluator 238 and second evaluator 248 in computer system 206 enables processing of alerts received by computer system 206 from computing devices. In particular, alert manager 208 using first evaluator 238 and second evaluator 248 transforms computer system 206 into a special purpose computer system as compared to currently available general computer systems that do not have alert manager 208 that uses first evaluator 238 and second evaluator 248.

In the illustrative example, the use of alert manager 208 using first evaluator 238 and second evaluator 248 in computer system 206 integrates processes into a practical application for processing alerts that increases the performance of computer system 206. In other words, alert manager 208 using first evaluator 238 and second evaluator 248 in computer system 206 is directed to a practical application of processes integrated into alert manager 208 using first evaluator 238 and second evaluator 248 in computer system 206 that can process an alert that is identical or similar to previously process alerts using previously processed alerts and information stored from processing those alerts. This process can also use a machine learning model to process entirely new alerts that are not similar or identical to previously processed alerts.

The illustration of alert environment 200 in the different components and data flows used in alert environment 200 in FIGS. 2-5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, first evaluator 238 and second evaluator 248 are shown as separate components from alert manager 208, functions of these components can be implemented within alert manager 208. Additionally, one or more computing devices in addition to computing device 218 can send alerts to alert manager 208 for processing at the same time as alert 204.

Further, in addition to security alerts, the alerts handled by alert manager 208 can take other forms. For example, these alerts can be performance alerts generated based on the performance of software in a computing device. The performance alerts can be generated by an agent based on using thresholds for performance metrics such as processing time, processor usage, network usage, memory use, storage use, and other metrics. In another illustrative example, the alerts can be manufacturing alerts generated by an agent using thresholds or metrics related to manufacturing products. For example, the alerts to the generated based on thresholds for metrics such as inspection statistics, raw resource usage, temperature, pressure, and other metrics that can be measured when manufacturing products.

As yet another illustrative example, the alerts can be generated by power generation plants. The alerts can be generated based on thresholds for metrics such as electricity generation, load, demand, distribution, power loss, and other metrics that can be measured at computing devices located in power plants, transmission stations, and other suitable locations. In still another illustrative example, the alerts can be communications alerts generated for the communications network such as a wireless communications network. Agents in computing devices such as mobile phones, laptop computers. These computing devices can be located in locations such as a metro telecommunications data center, a central data center, a gateway, a base station, or some other suitable location. In another illustrative example, the alerts can be generated by a cloud provider and contain information about which specific service is being accessed, the user accessing it, their privileges, their origin and the actions being initiated on the service or the data hosted by such a service.

In yet another illustrative example, alert level 240 can have more alert levels or fewer alert levels than serious 506, ambiguous 510, an inconsequential 514. For example, alert level 240 can have four alert levels, such as urgent, serious, ambiguous, and inconsequential.

Figure 6:
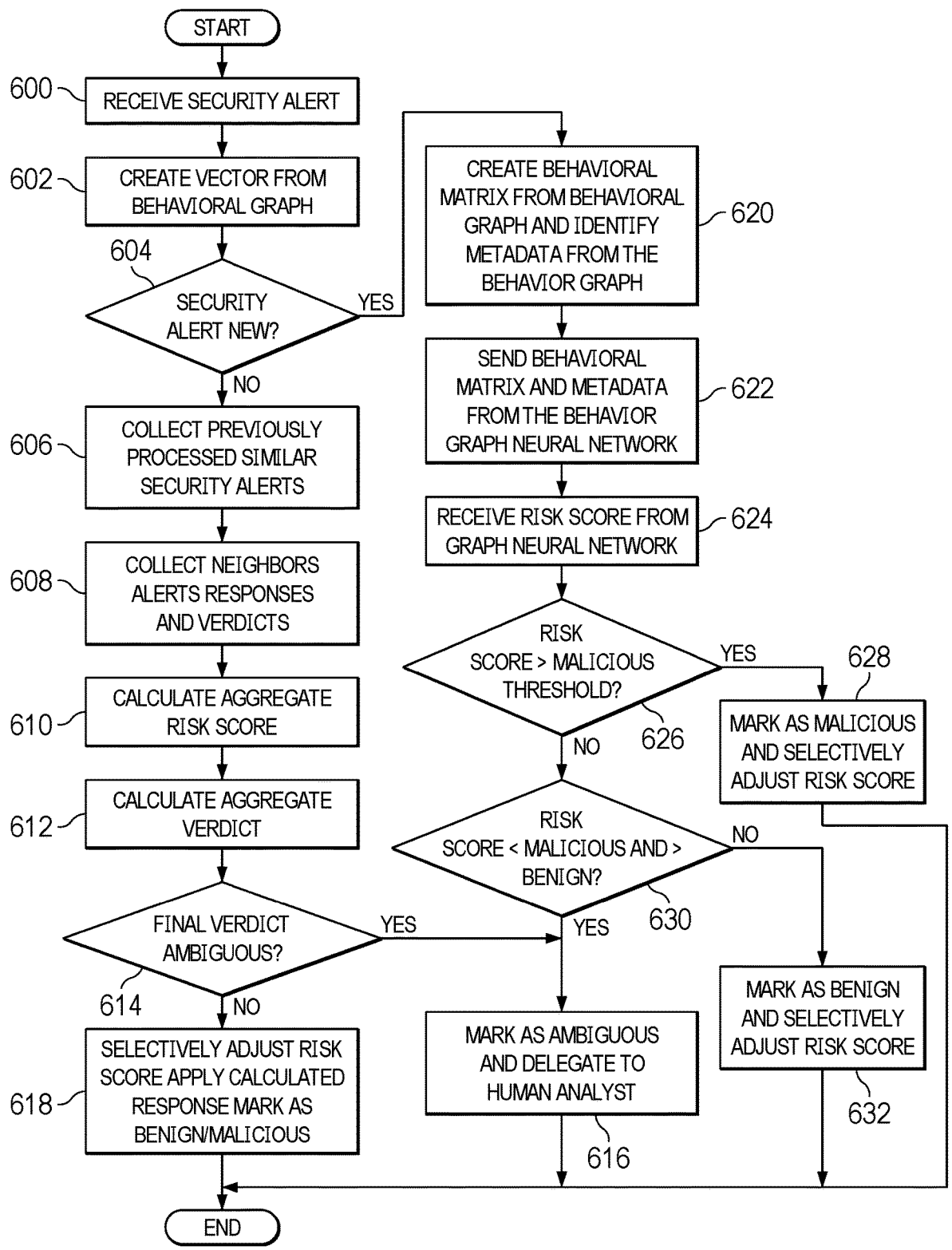
FIG. 6 is a flowchart of a process for processing an alert in accordance with an illustrative embodiment.

Turning next to FIG. 6, a flowchart of a process for processing an alert is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in alert manager 208 in computer system 206 in FIG. 2. In this example, the process is for processing alerts in the form of security alerts received from endpoints.

The process begins by receiving a security alert (step 600). In step 600, the security alert is received from an agent in a computing device. This security alert includes a behavioral graph with nodes and edges identifying behaviors using events and logical connections between events occurring in computing device that resulted in the generation of the security alert.

The process then creates a vector of the events using the behavioral graph (step 602). In this illustrative example, the vector is a vector representation of the events and can be generated from traversing all different paths in the behavioral graph. This vector representation can be, for example, vector 230 in FIG. 2 or vector 318 in FIG. 3. The vector representation can be tokenized to transform strings and metadata in numerical form. This vector for the security alert that can be compared to other vectors for previously processed security alerts. With the coordinates, the relative distance of the vector coordinates between the security alert and the previously processed security alerts can be determined by comparing the vector for the security alert with the vectors for the previously processed security alerts.

The process determines whether the behavior for the security alert is a new behavior (step 604). In other words, determination is made as to whether the security alert is a new security alert. This determination can be made by comparing the different factors and identifying vectors that are identical or similar to the vector for the security alert based on the vector for the security alert being within a threshold distance from other vectors for previously processed security alerts.

If the determination that security alert is not a new behavior in step 602, the process collects previously processed security alerts that are identical to the alert and previously processed alerts that are within the similarity threshold to form previously processed similar alerts (step 606). In step 606, the processing of previous security alerts can include information such as at least one of the behavioral graph, metadata for nodes, a vector, or a vector with adjustments from processing, a risk score, an impact level, or other information that can be used in evaluating current security alerts by comparing the previously processed security alerts.

The process also collects the responses and verdicts for the previously processed alerts that are identical or within the similarity threshold (step 608). In step 608, the responses are the actions taken for the previously processed security alerts that are collected. These actions may be, for example, removing an executable from an executable file from a temporary folder, or some other action taken for a prior security alert. The prior verdicts are the labels applied to identify the severity of the previously processed security alerts. For example, a prior verdict can be malicious, ambiguous, or benign.

The process calculates an aggregate risk score for the previously processed similar alerts (step 610). In step 610, the risk scores from the previously processed security alerts that are considered similar and are used determine the aggregated risk for the security alert being reprocessed. In the illustrative example, this adjustment can be used by comparing the distance of the security alert from other previously processed security alerts and their risk scores. The distance can be determined based on the vectors and adjustments can be made by comparing risk scores and distances.

For example, with a risk score from 0 to 100 and the risk score received with the security alert is 75. One vector located very close in the vector space to the vector being analyzed has a risk score of 99, while a second vector, farther in the vector space from the one being analyzed has a risk score of 70. In this case, the risk level may be adjusted from 75 to 89.

The process then calculates an aggregate verdict (step 612). In step 612, the aggregate verdict is based on the verdicts of the previously processed security alerts. For example, all of the verdicts may be benign. In this case, the aggregate verdict is benign. In another example, five of the verdicts can be benign while five verdicts are malicious. In this case, the aggregate verdict is ambiguous.

The process determines whether the final verdict is ambiguous (step 614). If the final verdict is ambiguous, the process marks the alert as ambiguous and sends the alert to a human analyst (step 616). The process terminates thereafter.

With reference again to step 614, if the final verdict is not ambiguous, the process selectively adjusts the risk score and marks the security alert as being benign or malicious based on the risk score (step 618). The process terminates thereafter. In step 618, the risk score can be adjusted based on various factors. One factor that can be considered is the endpoint or computing device on which the security alert was generated. For example, if the alert score is 95, the score can be reduced to 87 if security the alert was generated on a kiosk or on another non-critical device. As another example, the risk score can be increased to 100 if the security alert was generated by a computing device in the form server computer.

With reference again to step 604, if the security alert is new, the process creates a behavioral matrix from the behavioral graph and identify metadata from the behavioral graph (step 620). In this example, the behavioral matrix is an adjacency matrix that identifies the connections of nodes to each other. The process sends the behavioral matrix and metadata extracted from the behavioral graph to a graph neural network (step 622). The process receives a risk score from the graph neural network (step 624).

The process determines whether the risk score is greater than a malicious threshold (step 626). If the risk score is greater than the malicious threshold, the process marks the security alert as malicious and selectively adjusts the risk score (step 628). The process terminates thereafter. In step 628, the risk score can be selectively adjusted. For example, the risk score output by the graph neural network can be used to replace the risk score received in the metadata in the behavioral graph received for the security alert. In this illustrative example, the risk score generated by the graph neural network can be considered as more accurate than the risk initially determined by the agent in the computing device.

With reference again to step 626, if the risk score is no greater than the malicious risk score, a determination is made as to whether the risk score is less than the malicious threshold and greater than a benign threshold (step 630). If the risk score is less than the malicious threshold but greater than the benign threshold, the security alert is considered to be ambiguous and the process proceeds step 616 as described above.

Otherwise, the process marks the security alert as benign and selectively adjusts the risk score (step 632). In step 632, the risk score initially assigned to the security alert by the agent at the end point can be adjusted based on the risk score generated by the graph neural network. The initial risk score can be replaced or increased based on the rescore output by the graph neural network. The process terminates thereafter.

Figure 7:
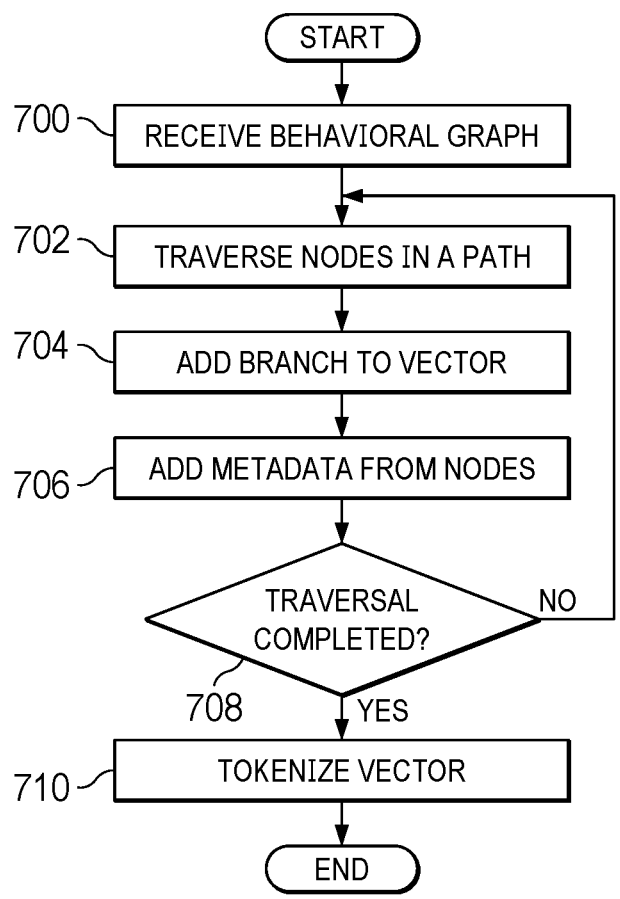
FIG. 7 is a flowchart of a process for generating a vector from a behavioral graph in accordance with an illustrative embodiment.

With reference next to FIG. 7, a flowchart of a process for generating a vector from a behavioral graph is depicted in accordance with an illustrative embodiment. The process in this flowchart is an example implementation for step 602 in FIG. 6. In this example, the process can generate a vector such as vector 318. Further, that can be tokenized to form another form of the vector, such as vector 326 in FIG. 3.

The process begins by receiving a behavioral graph (step 700). The process traverses nodes in a path (step 702). In step 702, the nodes in this path represent a branch for a vector. The process adds the branch to a vector (step 704). The process then adds metadata from the nodes to the vector (step 706).

A determination is made as to whether the traversal through the behavioral graph is completed (step 708). If the traversal is not complete, the process returns to step 702 to traverse another path in the behavioral graph.

Otherwise, the process tokenizes the vector (step 710) with the process terminating thereafter. In step 710, the tokenization can be performed in a number of different ways. For example, tokenization can be performed using techniques such as, for example, one-hot encoding, term frequency-inverse document frequency (tf-idf), Count Vectors, word2vec, and other suitable techniques.

Figure 8:
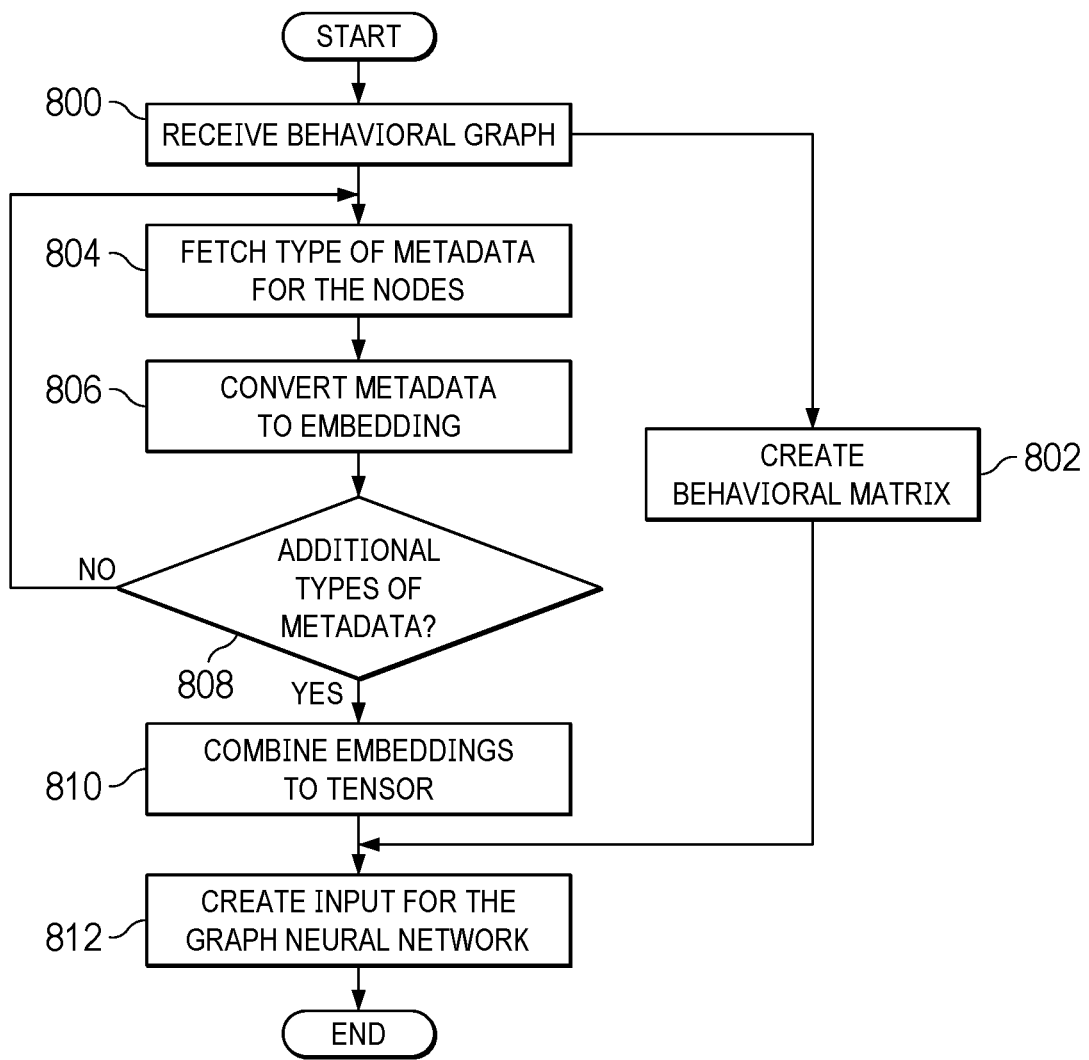
FIG. 8 is a flowchart of a process for generating input to a graph machine learning model in accordance with an illustrative embodiment.

Turning to FIG. 8, a flowchart of a process for generating input to a graph machine learning model is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. For example, the process can be implemented in alert manager 208 in computer system 206 in FIG. 2 to use second evaluator 248 to generate the input for graph neural network 502.

The process depicted in this flowchart can be used to generate input from a behavioral graph for a graph machine learning model to generate a risk score. In this illustrative example, the input is a behavioral graph such as behavioral graph 220. This behavioral graph is used to generate input in the form of a behavioral matrix and metadata such as behavioral matrix 500 and metadata 226 that can be used by graph neural network 502 to generate an alert score in the form of a risk score when the alert takes the form of a security alert. This process can be used as an example implementation for step 620 in FIG. 6.

The process begins by receiving a behavioral graph for processing (step 800). The process creates a behavioral matrix (step 802). In step 802, the behavioral matrix is an adjacency matrix. This matrix contains rows of nodes in which a logic "1" indicates a connection to the node identified in the column.

In parallel, the process fetches a type of metadata for the nodes (step 804). In the illustrative example, the nodes can contain different types of metadata for processing. In this example, step 804 calls or extracts one type of metadata. Metadata can be, for example, filename, command line, argument, privilege, or other suitable types of metadata.

The process then converts the metadata into an embedding (step 806). A determination is made as to whether additional types of metadata are present for embedding (step 808). If additional types of metadata are not present for extraction and embedding, the process returns to step 804. Otherwise, the process combines the embeddings into a tensor (step 810).

With the results from step 802 and step 810, the process creates the input for the graph neural network (step 812). The process terminates thereafter. In step 812, the process receives the behavioral matrix created in step 802 and the tensor created in step 810. These two components form the input for the neural network.

In this example, step 802 and steps 804-810 are performed in parallel. In other examples, the steps can be performed sequentially to provide the results for creating the input and step 812.

Figure 9:
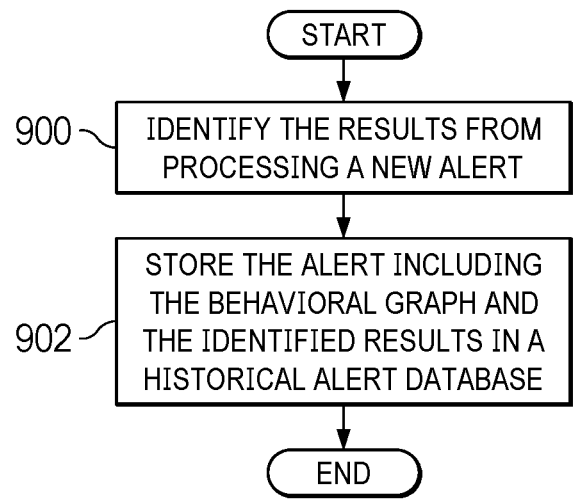
FIG. 9 is a flowchart of a process for updating a historical alert database in accordance with an illustrative embodiment.

With reference to FIG. 9, a flowchart of a process for updating a historical alert database is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in alert manager 208 in computer system 206 in FIG. 2.

The process begins by identifying the results from processing a new alert (step 900). In step 900, the results from processing a new alert can be received from a human user. The results can include at least one of an alert score, and alert level, extracted metadata, a behavioral matrix, a tensor, recommended actions, or other information. In another illustrative example, these results can also include results from processing of new alerts by a second evaluator using a machine learning model.

The process stores the alert including the behavioral graph and the identified results in a historical alert database (step 902) with the process terminating thereafter. With the storing of this information, the first evaluator used by an alert manager can now process new alerts that are identical or similar to the new alert that has been stored in historical alert database as a previously processed alert. This update of the historical database can provide one-shot learning for processing future alerts.

Figure 10:
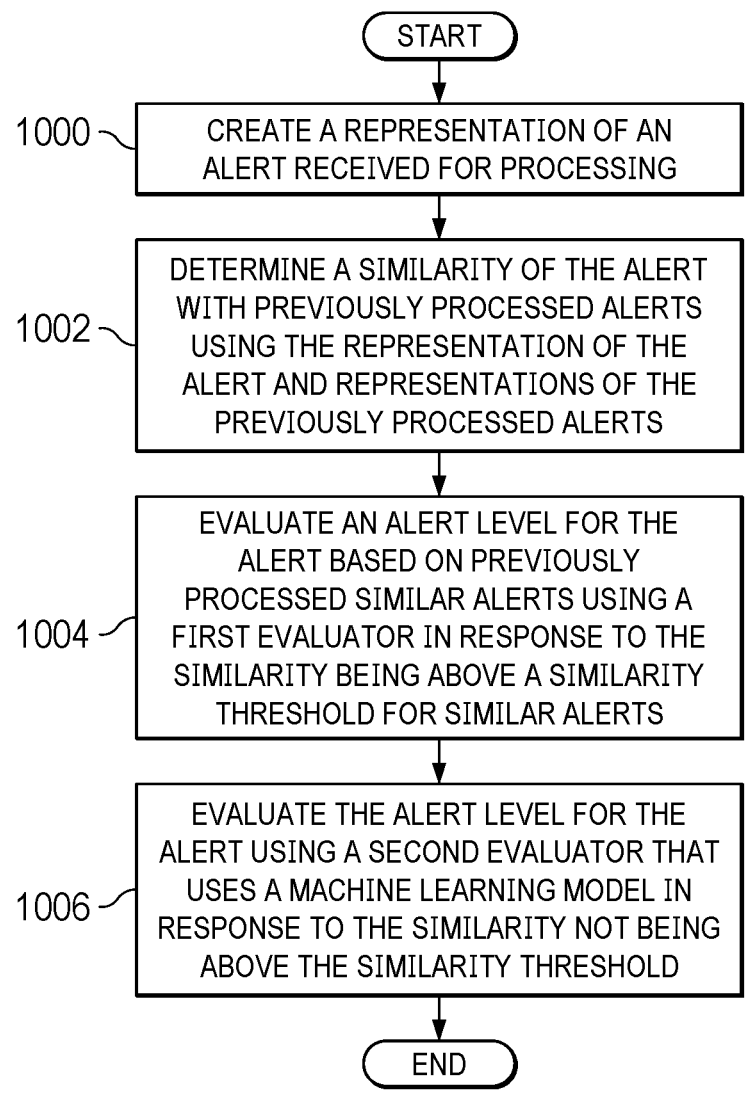
FIG. 10 is a flowchart of a process for evaluating an alert in accordance with an illustrative embodiment.

With reference to FIG. 10, a flowchart of a process for evaluating an alert is depicted in accordance with an illustrative embodiment. The process illustrated in FIG. 10 can be implemented using computer system 206 in FIG. 2. For example, the process can be implemented in alert manager 208 in computer system 206 in FIG. 2.

The process begins by creating a representation of an alert received for processing (step 1000). The process determines a similarity of the alert with previously processed alerts using the representation of the alert and representations of the previously processed alerts (step 1002).

The process evaluates an alert level for the alert based on previously processed similar alerts using a first evaluator in response to the similarity being above a similarity threshold for similar alerts (step 1004). The process evaluates the alert level for the alert using a second evaluator that uses machine learning model in response to the similarity not being above the similarity threshold (step 1006). The process terminates thereafter.

Figure 11:
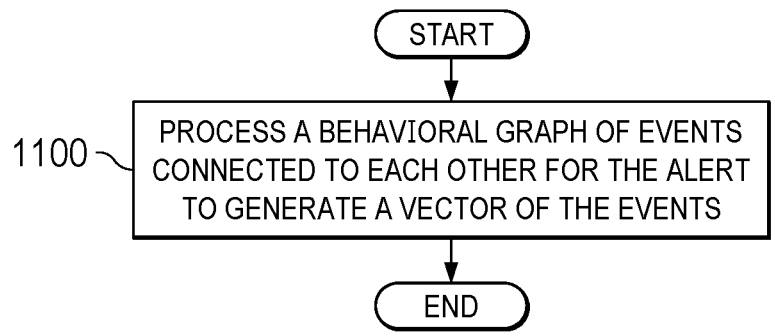
FIG. 11 a flowchart of a process for processing a behavioral graph of events to generate a vector of the events in accordance with an illustrative embodiment.

Turning next to FIG. 11, a flowchart of a process for processing a behavioral graph of events to generate a vector of the events is depicted in accordance with an illustrative embodiment. The process illustrated in FIG. 11 is an example of one implementation for step 1000 in FIG. 10.

The process processes a behavioral graph of events connected to each other for the alert to generate a vector of the events (step 1100). The process terminates thereafter.

Figure 12:
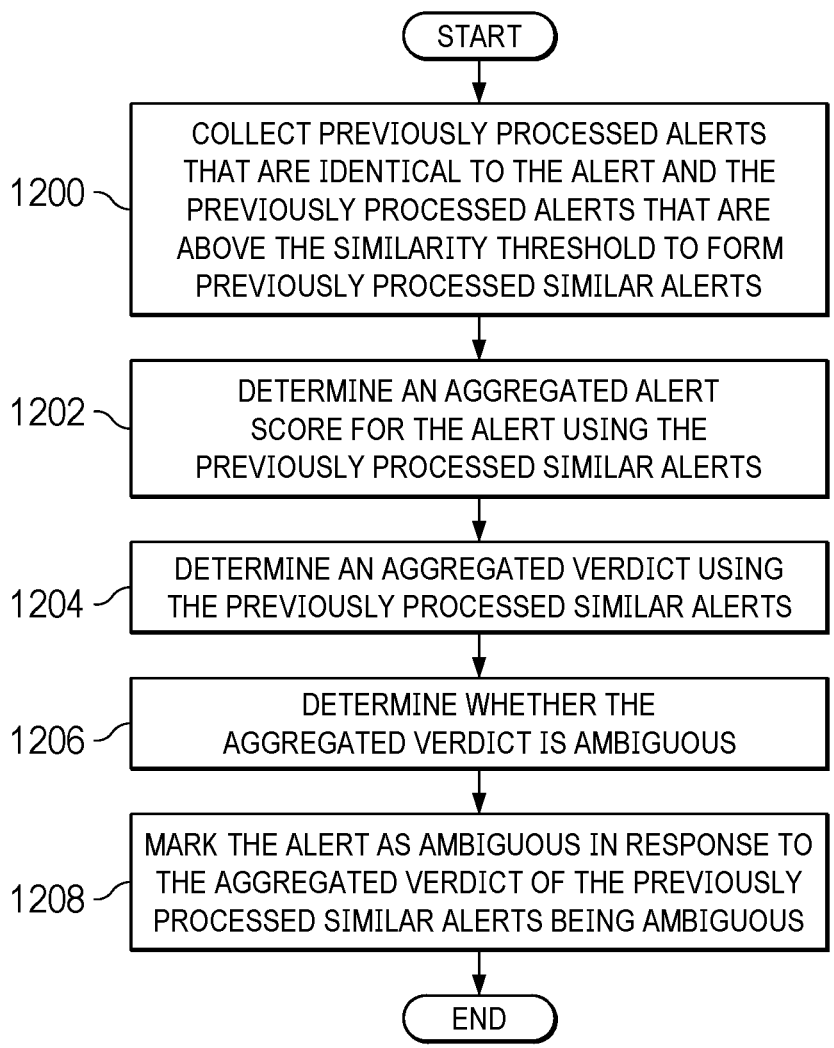
FIG. 12 is a flowchart of a process for evaluating an alert level using a first evaluator in accordance with an illustrative embodiment.

With reference to FIG. 12, a flowchart of a process for evaluating an alert level using a first evaluator is depicted in accordance with an illustrative embodiment. The process illustrated in FIG. 12 is an example of one implementation for step 1004 in FIG. 10.

The process begins by collecting previously processed alerts that are identical to the alert and the previously processed alerts that are above the similarity threshold to form previously processed similar alerts (step 1200). The process determines an aggregated alert score for the alert using the previously processed similar alerts (step 1202). The process determines an aggregated verdict using the previously processed similar alerts (step 1204). The process determines whether the aggregated verdict is ambiguous (step 1206).

The process marks the alert as ambiguous in response to the aggregated verdict of the previously processed similar alerts being ambiguous (step 1208). The process terminates thereafter.

Figure 13:
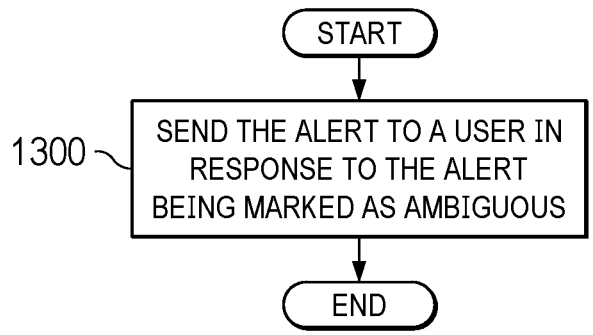
FIG. 13 is a flowchart of a process for sending an alert to a user in accordance with an illustrative embodiment.

With reference now to FIG. 13, a flowchart of a process for sending an alert to a user is depicted in accordance with an illustrative embodiment. The process illustrated in FIG. 13 is an example of an additional step that can be used in step 1004 in FIG. 10 in addition to the steps in FIG. 12.

The process sends the alert to a user in response to the alert being marked as ambiguous (step 1300). The process terminates thereafter.

Figure 14:
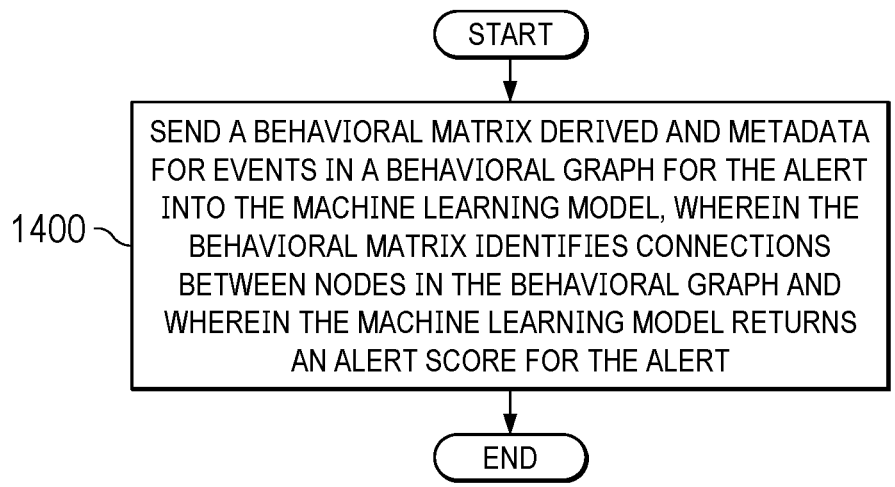
FIG. 14 is a flowchart of a process for evaluating an alert level using a second evaluator in accordance with an illustrative embodiment.

Turning next to FIG. 14, a flowchart of a process for evaluating an alert level using a second evaluator is depicted in accordance with an illustrative embodiment. The process illustrated in FIG. 14 is an example of one implementation for step 1006 in FIG. 10.

The process sends a behavioral matrix derived and metadata for events in a behavioral graph for the alert into the machine learning model, wherein the behavioral matrix identifies connections between nodes in the behavioral graph and wherein the machine learning model returns an alert score for the alert (step 1400). The process terminates thereafter.

Figure 15:
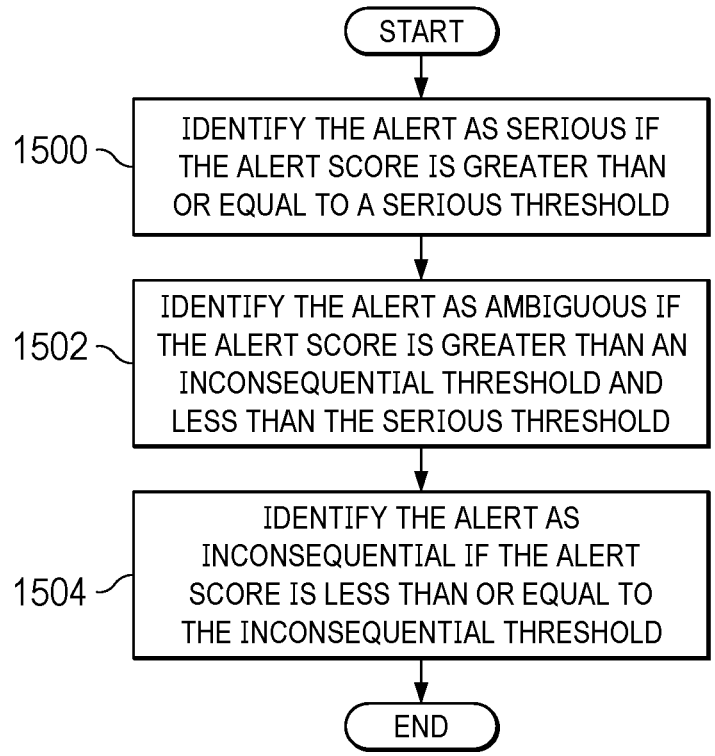
FIG. 15 is a flowchart of a process for identifying an alert as serious, ambiguous, or inconsequential in accordance with an illustrative embodiment.

With reference to FIG. 15, a flowchart of a process for identifying an alert as serious, ambiguous, or inconsequential is depicted in accordance with an illustrative embodiment. The process illustrated in FIG. 15 is an example additional steps that can be used in step 1006 in FIG. 10 in addition to the steps in FIG. 14. These identifications of alerts can be applied to other types of alerts other than security alerts.

The process begins by identifying the alert as serious if the alert score is greater than or equal to a serious threshold (step 1500). The process identifies the alert as ambiguous if the alert score is greater than a benign threshold and less than the serious threshold (step 1502).

The process identifies the alert as inconsequential if the alert score is less than or equal to the inconsequential threshold (step 1504). The process terminates thereafter.

Figure 16:
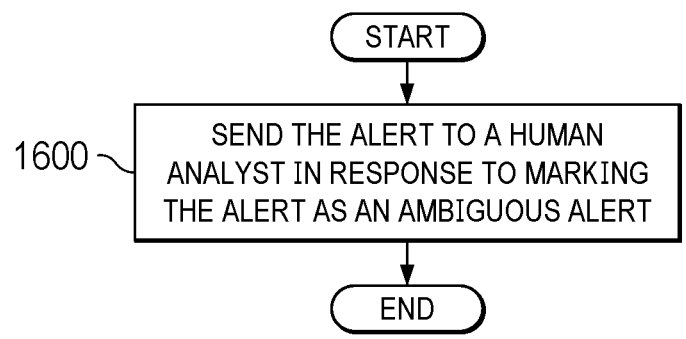
FIG. 16 is a flowchart of a process for sending an alert to a human analyst in accordance with an illustrative embodiment.

Turning to FIG. 16, a flowchart of a process for sending an alert to a human analyst is depicted in accordance with an illustrative embodiment. The process illustrated in FIG. 16 is an example an additional step that can be used in step 1006 in FIG. 10 in addition to the steps in FIG. 15.

The process sends the alert to a human analyst in response to marking the alert as an ambiguous alert (step 1600). The process terminates thereafter.

Figure 17:
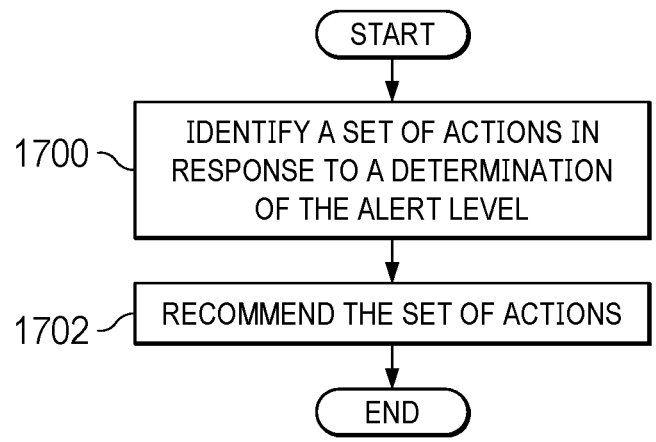
FIG. 17 is a flowchart of a process for recommending a set of actions in accordance with an illustrative embodiment.

Turning next to FIG. 17, a flowchart of a process for recommending a set of actions is depicted in accordance with an illustrative embodiment. The step illustrated in FIG. 17 is an example of an additional steps that can be used with the steps in the process in FIG. 10.

The process begins by identifying a set of actions in response to a determination of the alert level (step 1700). The process recommends the set of actions (step 1702). The process terminates thereafter.

Figure 18:
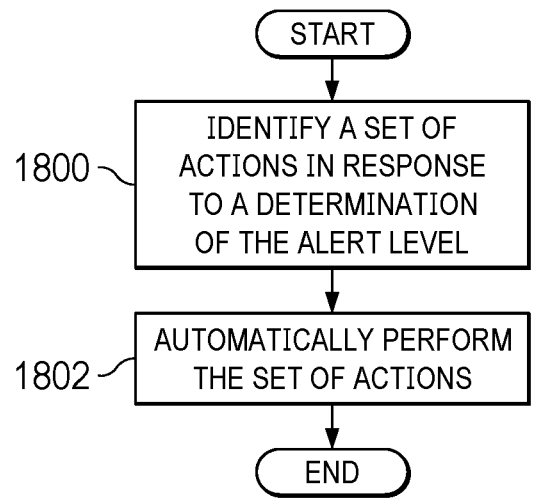
FIG. 18 is a flowchart of a process for automatically performing a set of actions in accordance with an illustrative embodiment.

With reference to FIG. 18, a flowchart of a process for automatically performing a set of actions is depicted in accordance with an illustrative embodiment. The step illustrated in FIG. 18 is an example of an additional steps that can be used with the steps in the process in FIG. 10.

The process begins by identifying a set of actions in response to a determination of the alert level (step 1800). The process automatically performs the set of actions (step 1802). The process terminates thereafter.

Figure 19:
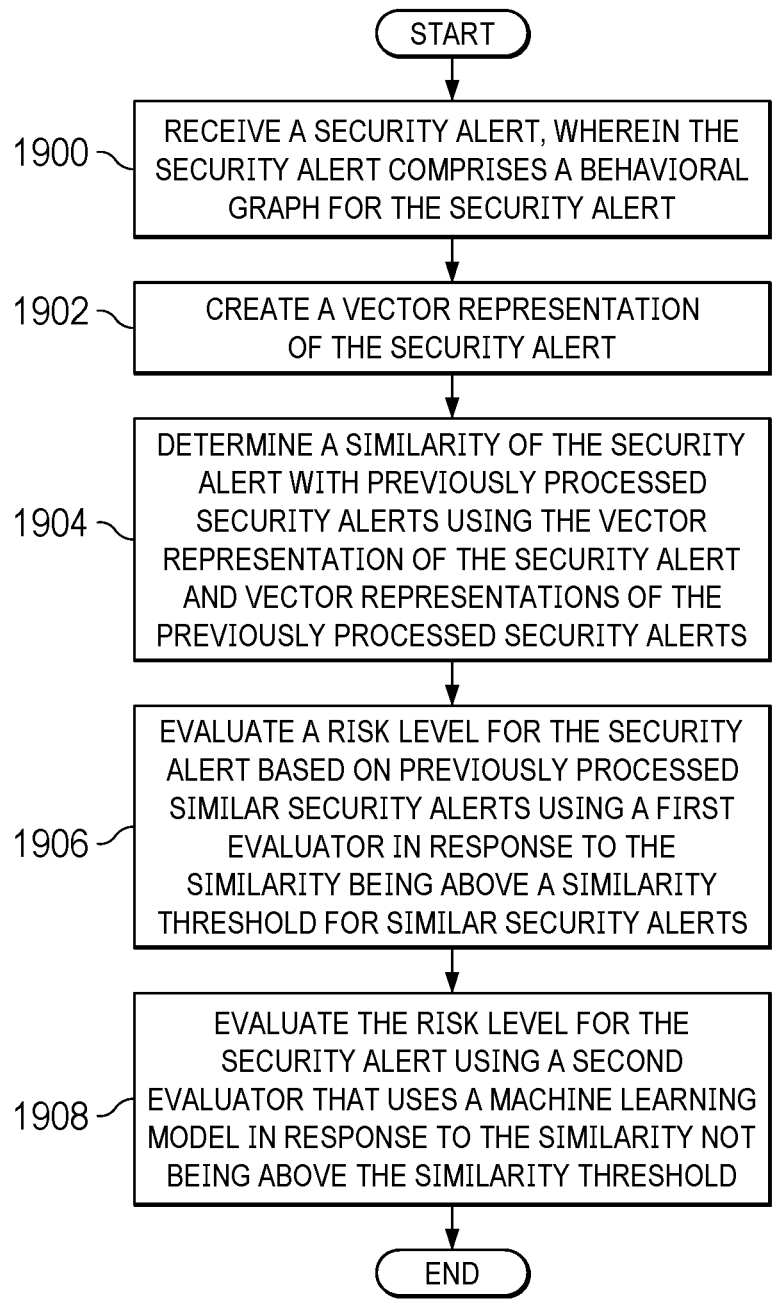
FIG. 19 is a flowchart of a process for processing security alerts in accordance with an illustrative embodiment.

Turning to FIG. 19, a flowchart of a process for processing security alerts is depicted in accordance with an illustrative embodiment. The process illustrated in FIG. 19 can be implemented using computer system 206 in FIG. 2. For example, the process can be implemented in alert manager 208 in computer system 206 in FIG. 2.

The process begins by receiving a security alert, wherein the security alert comprises a behavioral graph for the security alert (step 1900). The process creates a vector representation of the security alert (step 1902). The process determines a similarity of the security alert with previously security processed alerts using the vector representation of the security alert and vector representations of the previously processed security alerts (step 1904). The process evaluates a risk level for the security alert based on previously processed similar security alerts using a first evaluator in response to the similarity being above a similarity threshold for similar security alerts (step 1906). The process evaluates the risk level for the security alert using a second evaluator that uses a machine learning model in response to the similarity not being above the similarity threshold (step 1908). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 20:
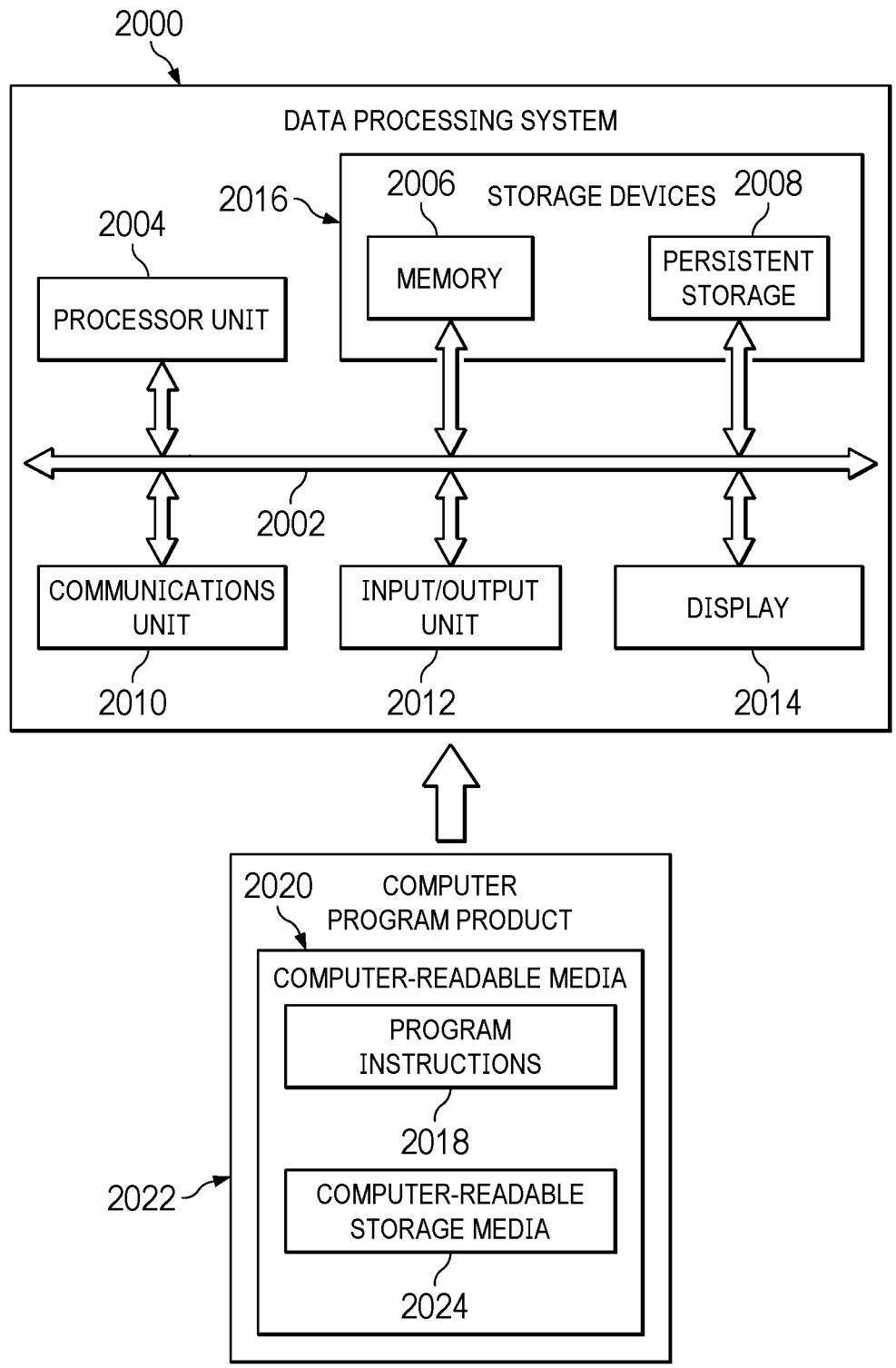
FIG. 20 is a block diagram of a data processing system in accordance with an illustrative embodiment.

Turning now to FIG. 20, a block diagram of a data processing system is depicted in accordance with an illustrative embodiment. Data processing system 2000 can be used to implement server computer 104, server computer 106, client devices 110, in FIG. 1. Data processing system 2000 can also be used to implement computer system 206 and computing device 218 in FIG. 2. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 may take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 may provide a connection for user input through at least one of a keyboard, a mouse, or some other suitable input device. Further, input/output unit 2012 may send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which may be located in a memory, such as memory 2006.

These instructions are referred to as program instructions, computer usable program instructions, or computer-readable program instructions that can be read and executed by a processor in processor unit 2004. The program instructions in the different embodiments can be embodied on different physical or computer-readable storage media, such as memory 2006 or persistent storage 2008.

Program instructions 2018 is located in a functional form on computer-readable media 2020 that is selectively removable and can be loaded onto or transferred to data processing system 2000 for execution by processor unit 2004. Program instructions 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program instructions 2018 rather than a medium that propagates or transmits program instructions 2018. Computer-readable storage media 2024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2018 can be transferred to data processing system 2000 using a computer-readable signal media. The computer-readable signal media are signals and can be, for example, a propagated data signal containing program instructions 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program instructions 2018 can be located in computer-readable media 2020 in the form of a single storage device or system. In another example, program instructions 2018 can be located in computer-readable media 2020 that is distributed in multiple data processing systems. In other words, some instructions in program instructions 2018 can be located in one data processing system while other instructions in program instructions 2018 can be located in one data processing system. For example, a portion of program instructions 2018 can be located in computer-readable media 2020 in a server computer while another portion of program instructions 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, may be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program instructions 2018.

Thus, illustrative embodiments of the present invention provide a computer implemented method, an apparatus, a computer system, and a computer program product for processing alerts. A computer system creates a representation of an alert received for processing. The computer system determines a similarity of the alert with previously processed alerts using the representation of the alert and representations of the previously processed alerts. A first evaluator in the computer system evaluates an alert level for the alert based previously processed similar alerts in response to the similarity being above a similarity threshold for similar alerts. A second evaluator in the computer system evaluates, the alert level for the alert using a machine learning model in response to the similarity not being above the similarity threshold.

In the illustrative examples, the alert manager using a first evaluator the second evaluator can analyze alerts automatically and selectively process the alerts baseline evaluation of how similar received alerts are to two previously processed alerts. Further, the alert processing system can increase its knowledge of alert processing through responses generated by users such as human analyst or machine learning models. These results can become part of the knowledge base in a historical alert database that can be used for processing alerts that are similar or identical to previously processed alerts. As new processed alerts are added to the historical alert database this information can be leveraged to process future alerts.

As result, the amount of time and resources needed to process alerts is decreased using the alert processing system in the different illustrative examples. In reliance on human analyst can be reduced using this type of system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for processing alerts, the computer implemented method comprising:
   creating, by a computer system, a representation of an alert received for processing;
   determining, by the computer system, a similarity of the alert with previously processed alerts using the representation of the alert and representations of the previously processed alerts;
   evaluating, by a first evaluator in the computer system, an alert level for the alert based on previously processed similar alerts in response to the similarity being above a similarity threshold for similar alerts, wherein evaluating, by the first evaluator in the computer system, the alert level for the alert based on previously processed similar alerts in response to the similarity being above the similarity threshold for similar alerts comprises:
      collecting, by the computer system, previously processed alerts that are identical to the alert and the previously processed alerts that are above the similarity threshold to form previously processed similar alerts;
      determining, by the computer system, an aggregated verdict using the previously processed similar alerts;
      determining, by the computer system, whether the aggregated verdict is ambiguous; and
      marking, by the computer system, the alert as ambiguous in response to the aggregated verdict of the previously processed similar alerts being ambiguous; and
   evaluating, by a second evaluator in the computer system, the alert level for the alert using a machine learning model in response to the similarity not being above the similarity threshold, wherein evaluating, by the second evaluator in the computer system, the alert level for the alert further comprises:
      identifying, by the second evaluator in the computer system, the alert as serious if an alert score is greater than or equal to a serious threshold;
      identifying, by the second evaluator in the computer system, the alert as ambiguous if the alert score is greater than an inconsequential threshold and less than the serious threshold; and
      identifying, by the second evaluator in the computer system, the alert as inconsequential if the alert score is less than or equal to the inconsequential threshold.

2. The computer implemented method of claim 1, wherein creating, by the computer system, the representation of the alert comprises:

processing, by the computer system, a behavioral graph of events connected to each other for the alert to generate a vector of the events.

3. The computer implemented method of claim 2, wherein the behavioral graph of the events comprises nodes for the events, edges connecting the nodes and metadata for the events, wherein an edge represents a flow from one node to another node and the metadata uniquely identifies each event.

4. The computer implemented method of claim 3, wherein the metadata includes alert scores for the events and uniquely identifies the events on a computing device.

5. The computer implemented method of claim 1, wherein evaluating, by the first evaluator in the computer system, the alert level for the alert based on previously processed similar alerts in response to the similarity being above the similarity threshold for similar alerts further comprises:
   sending, by the computer system, the alert to a user in response to the alert being marked as ambiguous.

6. The computer implemented method of claim 1, wherein evaluating, by the second evaluator in the computer system, the alert level for the alert comprises:
   sending, by the second evaluator in the computer system, a behavioral matrix derived and metadata for events in a behavioral graph for the alert into the machine learning model, wherein the behavioral matrix identifies connections between nodes in the behavioral graph and wherein the machine learning model returns an alert score for the alert.

7. The computer implemented method of claim 1, wherein evaluating, by the second evaluator in the computer system, the alert level for the alert further comprises:
   sending, by the second evaluator in the computer system, the alert to a human analyst in response to marking the alert as an ambiguous alert.

8. The computer implemented method of claim 1 further comprising:
   identifying, by the computer system, a set of actions in response to a determination of the alert level; and
   recommending, by the computer system, the set of actions.

9. The computer implemented method of claim 1 further comprising:
   identifying, by the computer system, a set of actions in response to a determination of the alert level; and
   automatically performing, by the computer system, the set of actions.

10. A computer implemented method for processing security alerts, the computer implemented method comprising:
    receiving, by a computer system, a security alert, wherein the security alert comprises a behavioral graph for the security alert;
    creating, by the computer system, a vector representation of the security alert;
    determining, by the computer system, a similarity of the security alert with previously processed security alerts using the vector representation of the security alert and vector representations of the previously processed security alerts;
    evaluating, by a first evaluator in the computer system, a risk level for the security alert based on previously processed similar security alerts in response to the similarity being above a similarity threshold for similar security alerts, wherein evaluating, by the first evaluator in the computer system, the risk level for the security alert based on previously similar security alerts in response to the similarity being above the similarity threshold for similar security alerts comprises:
      collecting, by the computer system, previously processed security alerts that are identical to the security alert and the previously processed security alerts that are above the similarity threshold to form previously processed similar security alerts;
      determining, by the computer system, an aggregated verdict using the previously processed similar security alerts;
      determining, by the computer system, whether the aggregated verdict is ambiguous; and
      marking, by the computer system, the security alert as ambiguous in response to the aggregated verdict of the previously processed similar security alerts being ambiguous; and
    evaluating, by a second evaluator in the computer system, the risk level for the security alert using a machine learning model in response to the similarity not being above the similarity threshold, wherein evaluating, by the second evaluator in the computer system, the risk level for the security alert further comprises:
      identifying, by the second evaluator in the computer system, the security alert as serious if an alert score is greater than or equal to a serious threshold;
      identifying, by the second evaluator in the computer system, the security alert as ambiguous if the alert score is greater than an inconsequential threshold and less than the serious threshold; and
      identifying, by the second evaluator in the computer system, the security alert as inconsequential if the alert score is less than or equal to the inconsequential threshold.

11. A computer system comprising:
    comprising a number of processor units, wherein the number of processor units executes program instructions to:
    create a representation of an alert received for processing;
    determine a similarity of the alert with previously processed alerts using the representation of the alert and representations of the previously processed alerts;
    evaluate, by a first evaluator in the computer system, an alert level for the alert based on previously processed similar alerts in response to the similarity being above a similarity threshold for similar alerts, wherein in evaluating, by the first evaluator in the computer system, the alert level for the alert based on the previously processed similar alerts in response to the similarity being above the similarity threshold for similar alerts, the number of processor units executes program instructions to:
      collect previously processed alerts that are identical to the alert and the previously processed alerts that are above the similarity threshold to form previously processed similar alerts;
      determine an aggregated alert score for the alert using the previously processed similar alerts;
      determine an aggregated verdict using the previously processed similar alerts;
      determine whether the aggregated verdict is ambiguous; and
      mark the alert as ambiguous in response to the aggregated verdict of the previously processed similar alerts being ambiguous; and
    evaluate, by a second evaluator in the computer system, the alert level for the alert using a machine learning model in response to the similarity not being above the similarity threshold, wherein in evaluating, by the second evaluator in the computer system, the alert level for the alert, the number of processor units executes program instructions to:
identify the alert as serious if an alert score is greater than or equal to a serious threshold;
identify the alert as ambiguous if the alert score is greater than an inconsequential threshold and less than the serious threshold; and
identify the alert as inconsequential if the alert score is less than or equal to the inconsequential threshold.

12. The computer system of claim 11, wherein creating the representation of the alert comprises:
processing a behavioral graph representation of events connected to each other for the alert to generate a vector of the events.

13. The computer system of claim 12, wherein the behavioral graph representation of the events comprises nodes for the events, edges connecting the nodes, and metadata for the events, wherein an edge represents a flow from one node to another node and the metadata uniquely identifies each event.

14. The computer system of claim 13, wherein the alert is a security alert and the metadata includes alert scores for the events and uniquely identifies the events on a computing device.

15. The computer system of claim 11, wherein in evaluating, by the first evaluator in the computer system, the alert level for the alert based on previously processed similar alerts in response to the similarity being above the similarity threshold for similar alerts, the number of processor units executes program instructions to:
send the alert to a user in response to the alert being marked as ambiguous.

16. The computer system of claim 11 wherein in evaluating, by the second evaluator in the computer system, the alert level for the alert, the number of processor units executes program instructions to:
send a behavioral matrix derived and metadata for events in a behavioral graph for the alert into the machine learning model, wherein the behavioral matrix identifies connections between nodes in the behavioral graph and wherein the machine learning model returns an alert score for the alert.

17. The computer system of claim 11, wherein in evaluating, by the second evaluator in the computer system, the alert level for the alert, the number of processor units executes program instructions to:
send the alert to a human analyst in response to marking the alert as an ambiguous alert.

18. The computer system of claim 11, wherein the number of processor units executes program instructions to:
identify a set of actions in response to a determination of the alert level; and
recommend the set of actions.

19. The computer system of claim 11, wherein the number of processor units executes program instructions to:
identify a set of actions in response to a determination of the alert level; and
automatically perform the set of actions.

20. A computer system comprising:
comprising a number of processor units, wherein the number of processor units executes program instructions to:
receive a security alert, wherein the security alert comprises a behavioral graph for the security alert;
create a vector representation of a security alert;
determine a similarity of the security alert with previously processed security alerts using the vector representation of the security alert and vector representations of the previously processed security alerts;
evaluate a risk level for the security alert based on previously processed similar security alerts in response to the similarity being above a similarity threshold for similar security alerts, wherein in evaluating the risk level for the security alert based on the previously processed similar security alerts in response to the similarity being above the similarity threshold for similar security alerts, the number of processor units executes program instructions to:
collect previously processed security alerts that are identical to the security alert and the previously processed security alerts that are above the similarity threshold to form previously processed similar security alerts;
determine an aggregated alert score for the security alert using the previously processed similar security alerts;
determine an aggregated verdict using the previously processed similar security alerts;
determine whether the aggregated verdict is ambiguous; and
mark the security alert as ambiguous in response to the aggregated verdict of the previously processed similar security alerts being ambiguous; and
evaluate, by a second evaluator in the computer system, the risk level for the security alert using a machine learning model in response to the similarity not being above the similarity threshold, wherein in evaluating, by the second evaluator in the computer system, the risk level for the security alert, the number of processor units executes program instructions to:
identify the alert as serious if an alert score is greater than or equal to a serious threshold;
identify the alert as ambiguous if the alert score is greater than an inconsequential threshold and less than the serious threshold; and
identify the alert as inconsequential if the alert score is less than or equal to the inconsequential threshold.

21. A computer program product for processing alerts, the computer program product comprising a computer readable storage medium having program instructions embodied therewith, the program instructions executable by a computer system to cause the computer system to perform a method of:
creating, by the computer system, a representation of an alert received for processing;
determining, by the computer system, a similarity of the alert with previously processed alerts using the representation of the alert and representations of the previously processed alerts;
evaluating, by a first evaluator in the computer system, an alert level for the alert based on previously processed similar alerts in response to the similarity being above a similarity threshold for similar alerts, wherein evaluating, by the first evaluator in the computer system, the alert level for the alert based on previously processed similar alerts in response to the similarity being above the similarity threshold for similar alerts comprises:
collecting, by the computer system, previously processed alerts that are identical to the alert and the previously processed alerts that are above the similarity threshold to form previously processed similar alerts;

determining, by the computer system, an aggregated verdict using the previously processed similar alerts;

determining, by the computer system, whether the aggregated verdict is ambiguous; and marking, by the computer system, the alert as ambiguous in response to the aggregated verdict of the previously processed similar alerts being ambiguous; and evaluating, by a second evaluator in the computer system, the alert level for the alert using a machine learning model in response to the similarity not being above the similarity threshold, wherein evaluating, by the second evaluator in the computer system, the alert level for the alert further comprises:

identifying, by the second evaluator in the computer system, the alert as serious if an alert score is greater than or equal to a serious threshold;

identifying, by the second evaluator in the computer system, the alert as ambiguous if the alert score is greater than an inconsequential threshold and less than the serious threshold; and identifying, by the second evaluator in the computer system, the alert as inconsequential if the alert score is less than or equal to the inconsequential threshold.

\* \* \* \* \*